(12) United States Patent
Wang et al.

(10) Patent No.: US 11,561,376 B2
(45) Date of Patent: Jan. 24, 2023

(54) OPTICAL IMAGING LENS INCLUDING SEVEN LENSES OF --++-++ REFRACTIVE POWERS, OR EIGHT LENSES OF --++-+-+, --+++-+-, ---+-+-+ OR --+++-++ REFRACTIVE POWERS

(71) Applicant: Genius Electronic Optical (Xiamen) Co., Ltd., Fujian (CN)

(72) Inventors: Pei-Chi Wang, Taichung (TW); Yi-Ling Huang, Taichung (TW); Yen-Cheng Huang, Taichung (TW)

(73) Assignee: Genius Electronic Optical (Xiamen) Co., Ltd.

( * ) Notice: Subject to any disclaimer, the term of this patent is extended or adjusted under 35 U.S.C. 154(b) by 297 days.

(21) Appl. No.: 16/939,081

(22) Filed: Jul. 27, 2020

(65) Prior Publication Data
US 2021/0364744 A1 Nov. 25, 2021

(30) Foreign Application Priority Data
May 22, 2020 (CN) .......................... 202010439951.4

(51) Int. Cl.
*G02B 13/00* (2006.01)
*G02B 9/64* (2006.01)

(52) U.S. Cl.
CPC ........... *G02B 13/0045* (2013.01); *G02B 9/64* (2013.01)

(58) Field of Classification Search
CPC .............................. G02B 13/0045; G02B 9/64
See application file for complete search history.

(56) References Cited

U.S. PATENT DOCUMENTS

| 2018/0188500 A1 | 7/2018 | Jung |
| 2019/0278063 A1 | 9/2019 | Sekine |
| 2021/0157096 A1* | 5/2021 | Hirano ..................... G02B 9/64 |

FOREIGN PATENT DOCUMENTS

| CN | 110346920 A | 10/2019 |
| TW | I650592 B | 2/2019 |

* cited by examiner

*Primary Examiner* — Wen Huang
(74) *Attorney, Agent, or Firm* — Winston Hsu

(57) ABSTRACT

In an optical imaging lens, a first lens element has negative refracting power, a second lens element has negative refracting power, an optical axis region of the object-side surface of the third lens element is concave, an optical axis region of the object-side surface of the fourth lens element is convex, an optical axis region of the object-side surface of the fifth lens element is convex, a sixth lens element is arranged to be a lens element in a second order from an image-side to an object-side and a seventh lens element is arranged to be a lens element in a first order from the image-side to the object-side to satisfy: (G23+T3+T4+G45)/L57≥2.700 and υ1+υ2≤80.000.

19 Claims, 22 Drawing Sheets

| First Embodiment ||||||||
|---|---|---|---|---|---|---|---|
| TTL=29.845mm, EFL=1.481mm, HFOV=119.870 Degrees, ImgH=2.890mm, Fno=2.000 ||||||||
| No. | | Radius (mm) | Aperture Stop Distance/ Lens Thickness/ Air Gap (mm) | | Material | Refractive Index (Nd) | Abbe No. (Vd) | Focal length (mm) |
| | Object | INFINITY | INFINITY | | | | | |
| 11 | First Lens | 20.274 | 2.336 | T1 | Glass | 1.938 | 16.484 | -17.107 |
| 12 | | 8.457 | 4.711 | G12 | | | | |
| 21 | Second Lens | 23.602 | 1.255 | T2 | Glass | 1.878 | 31.314 | -5.593 |
| 22 | | 3.964 | 4.816 | G23 | | | | |
| 31 | Third Lens | -4.079 | 3.321 | T3 | Glass | 1.840 | 37.097 | 195.713 |
| 32 | | -5.460 | 0.216 | G34 | | | | |
| 41 | Fourth Lens | 7.807 | 2.943 | T4 | Glass | 1.886 | 20.880 | 9.556 |
| 42 | | 82.306 | 2.477 | G45 | | | | |
| 80 | Ape. Stop | INFINITY | -0.092 | | | | | |
| 51 | Fifth Lens | 5.654 | 1.178 | T5 | Glass | 1.883 | 18.895 | -8.489 |
| 52 | | 2.908 | 0.000 | G58 | | | | |
| 81 | Eighth Lens | 2.908 | 1.050 | T8 | Glass | 1.680 | 54.570 | 2.468 |
| 82 | | -3.386 | 0.000 | G86 | | | | |
| 61 | Sixth Lens | -3.386 | 0.700 | T6 | Glass | 1.938 | 16.484 | -2.471 |
| 62 | | 8.083 | 0.317 | G67 | | | | |
| 71 | Seventh Lens | 9.786 | 1.519 | T7 | Glass | 1.840 | 37.097 | 3.700 |
| 72 | | -4.231 | 0.150 | G7F | | | | |
| 90 | Filter | INFINITY | 0.285 | | Glass | 1.509 | 64.166 | |
| | | INFINITY | 0.475 | | | | | |
| 95 | Cover Glass | INFINITY | 0.380 | | Glass | 1.509 | 64.166 | |
| | | INFINITY | 1.796 | | | | | |
| 91 | Image Plane | INFINITY | 0.014 | | | | | |

FIG. 18

| No. | K | $a_2$ | $a_4$ | $a_6$ |
|---|---|---|---|---|
| 31 | -5.354054E-02 | 0.000000E+00 | 6.577730E-04 | 5.240024E-05 |
| 32 | -1.144663E-01 | 0.000000E+00 | 3.281019E-04 | 4.257878E-06 |
| 71 | -5.327317E+01 | 0.000000E+00 | 1.585482E-03 | -1.418800E-03 |
| 72 | 1.211112E+00 | 0.000000E+00 | 2.017165E-03 | -2.956507E-04 |

| No. | $a_8$ | $a_{10}$ | $a_{12}$ |
|---|---|---|---|
| 31 | -1.913626E-06 | 2.249389E-07 | |
| 32 | 3.157301E-08 | 5.589412E-09 | |
| 71 | 2.148486E-04 | -2.845530E-05 | 2.057114E-06 |
| 72 | 1.487958E-04 | -3.231241E-05 | 2.762261E-06 |

FIG. 19

| | Second Embodiment | | | | | | |
|---|---|---|---|---|---|---|---|
| | TTL=32.525mm, EFL=1.577mm, HFOV=110.000 Degrees, ImgH=2.882mm, Fno=2.400 | | | | | | |
| No. | | Radius (mm) | Aperture Stop Distance/ Lens Thickness/ Air Gap (mm) | | Material | Refractive Index (Nd) | Abbe No. (Vd) | Focal length (mm) |
| | Object | INFINITY | INFINITY | | | | | |
| 11 | First Lens | 25.770 | 0.980 | T1 | Glass | 1.537 | 45.832 | -24.536 |
| 12 | | 8.601 | 6.157 | G12 | | | | |
| 21 | Second Lens | 15.326 | 0.713 | T2 | Glass | 1.679 | 30.053 | -7.388 |
| 22 | | 3.706 | 5.254 | G23 | | | | |
| 31 | Third Lens | -6.108 | 4.232 | T3 | Glass | 1.938 | 16.484 | 22.413 |
| 32 | | -6.320 | 0.661 | G34 | | | | |
| 41 | Fourth Lens | 112.891 | 1.546 | T4 | Glass | 1.759 | 25.719 | 26.573 |
| 42 | | -24.395 | 3.455 | G45 | | | | |
| 80 | Ape. Stop | INFINITY | 0.309 | | | | | |
| 51 | Fifth Lens | 7.452 | 0.741 | T5 | Glass | 1.696 | 29.510 | 4.557 |
| 52 | | -5.299 | 0.136 | G58 | | | | |
| 81 | Eighth Lens | -5.818 | 0.835 | T8 | Glass | 1.938 | 16.484 | -3.085 |
| 82 | | 6.157 | 0.137 | G86 | | | | |
| 61 | Sixth Lens | 8.641 | 1.530 | T6 | Glass | 1.702 | 34.727 | 3.434 |
| 62 | | -3.098 | 0.426 | G67 | | | | |
| 71 | Seventh Lens | -11.421 | 2.097 | T7 | Glass | 1.938 | 16.484 | -32.391 |
| 72 | | -19.929 | 0.391 | G7F | | | | |
| 90 | Filter | INFINITY | 0.300 | | Glass | 1.509 | 64.166 | |
| | | INFINITY | 0.466 | | | | | |
| 95 | Cover Glass | INFINITY | 0.400 | | Glass | 1.509 | 64.166 | |
| | | INFINITY | 1.760 | | | | | |
| 91 | Image Plane | INFINITY | 3.240E-04 | | | | | |

FIG. 20

| No. | K | $a_2$ | $a_4$ | $a_6$ |
|---|---|---|---|---|
| 31 | -5.354054E-02 | 0.000000E+00 | -4.542408E-04 | 1.597864E-05 |
| 32 | -1.144663E-01 | 0.000000E+00 | 3.668604E-04 | 4.773571E-07 |
| 41 | -5.981938E+21 | 0.000000E+00 | 1.549067E-04 | -1.905937E-07 |
| 42 | 0.000000E+00 | 0.000000E+00 | -5.442053E-05 | -5.707588E-07 |
| 81 | 6.192644E+00 | 0.000000E+00 | -2.168698E-03 | -3.143045E-04 |
| 82 | -1.485156E+00 | 0.000000E+00 | -9.357390E-04 | -2.070359E-04 |
| 61 | -5.327317E+01 | 0.000000E+00 | 6.005929E-03 | -2.366079E-03 |
| 62 | 1.832982E-01 | 0.000000E+00 | 1.575469E-04 | 6.763856E-05 |
| No. | $a_8$ | $a_{10}$ | $a_{12}$ | |
| 31 | 6.293886E-07 | -4.929410E-08 | | |
| 32 | 3.388797E-07 | -6.333017E-09 | | |
| 41 | 2.479411E-07 | 2.454227E-08 | | |
| 42 | -4.589551E-08 | 5.823651E-09 | | |
| 81 | 2.260080E-05 | -4.250298E-07 | -8.056645E-19 | |
| 82 | -6.695211E-05 | -6.129102E-07 | -8.052147E-19 | |
| 61 | 3.832918E-04 | -4.335547E-05 | 2.254288E-06 | |
| 62 | -2.240677E-05 | -7.427796E-07 | -8.050274E-19 | |

FIG. 21

| No. | | Radius (mm) | Aperture Stop Distance/ Lens Thickness/ Air Gap (mm) | | Material | Refractive Index (Nd) | Abbe No. (Vd) | Focal length (mm) |
|---|---|---|---|---|---|---|---|---|
| | | Third Embodiment ||||||||
| | | TTL=28.974mm, EFL=1.583mm, HFOV=110.180 Degrees, ImgH=2.890mm, Fno=2.000 ||||||||
| | Object | INFINITY | INFINITY | | | | | |
| 11 | First Lens | 21.078 | 0.700 | T1 | Glass | 1.814 | 37.228 | -18.789 |
| 12 | | 8.729 | 6.420 | G12 | | | | |
| 21 | Second Lens | 10.544 | 0.900 | T2 | Glass | 1.817 | 42.721 | -5.966 |
| 22 | | 3.205 | 4.104 | G23 | | | | |
| 31 | Third Lens | -4.290 | 4.045 | T3 | Glass | 1.817 | 42.721 | -701.310 |
| 32 | | -6.154 | 0.050 | G34 | | | | |
| 41 | Fourth Lens | 6.156 | 1.590 | T4 | Glass | 1.879 | 37.053 | 12.053 |
| 42 | | 12.925 | 1.788 | G45 | | | | |
| 80 | Ape. Stop | INFINITY | 0.104 | | | | | |
| 51 | Fifth Lens | 6.209 | 1.611 | T5 | Glass | 1.886 | 20.880 | -11.374 |
| 52 | | 3.374 | 0.000 | G58 | | | | |
| 81 | Eighth Lens | 3.374 | 1.797 | T8 | Glass | 1.686 | 48.109 | 2.400 |
| 82 | | -2.520 | 0.000 | G86 | | | | |
| 61 | Sixth Lens | -2.520 | 0.800 | T6 | Glass | 1.886 | 20.880 | -2.465 |
| 62 | | 18.836 | 0.100 | G67 | | | | |
| 71 | Seventh Lens | 10.914 | 1.270 | T7 | Glass | 1.745 | 40.106 | 4.796 |
| 72 | | -5.043 | 0.593 | G7F | | | | |
| 90 | Filter | INFINITY | 0.300 | | Glass | 1.509 | 64.166 | |
| | | INFINITY | 0.500 | | | | | |
| 95 | Cover Glass | INFINITY | 0.400 | | Glass | 1.509 | 64.166 | |
| | | INFINITY | 1.890 | | | | | |
| 91 | Image Plane | INFINITY | 0.012 | | | | | |

FIG. 22

| No. | K | $a_2$ | $a_4$ | $a_6$ |
|---|---|---|---|---|
| 31 | -5.354054E-02 | 0.000000E+00 | 9.828242E-04 | 9.040482E-06 |
| 32 | -1.144663E-01 | 0.000000E+00 | 2.972413E-04 | -2.878038E-06 |
| 71 | -5.327317E+01 | 0.000000E+00 | 1.354447E-03 | -8.819527E-04 |
| 72 | 1.211112E+00 | 0.000000E+00 | 6.185927E-04 | -1.792714E-04 |
| No. | $a_8$ | $a_{10}$ | $a_{12}$ | |
| 31 | -7.027447E-07 | -1.794034E-07 | | |
| 32 | -3.324334E-07 | 1.346308E-08 | | |
| 71 | 1.577770E-04 | -1.527149E-05 | 1.076974E-06 | |
| 72 | 8.847466E-05 | -1.735247E-05 | 1.741710E-06 | |

FIG. 23

| | Fourth Embodiment ||||||||
|---|---|---|---|---|---|---|---|
| | TTL=27.499mm, EFL=1.718mm, HFOV=110.000 Degrees, ImgH=2.874mm, Fno=2.200 |||||||
| No. | | Radius (mm) | Aperture Stop Distance/ Lens Thickness/ Air Gap (mm) | | Material | Refractive Index (Nd) | Abbe No. (Vd) | Focal length (mm) |
| | Object | INFINITY | INFINITY | | | | | |
| 11 | First Lens | 15.594 | 0.875 | T1 | Glass | 1.825 | 30.060 | -16.504 |
| 12 | | 7.086 | 2.564 | G12 | | | | |
| 21 | Second Lens | 13.837 | 1.503 | T2 | Glass | 1.879 | 37.370 | -5.188 |
| 22 | | 3.254 | 3.451 | G23 | | | | |
| 31 | Third Lens | -7.338 | 4.646 | T3 | Glass | 1.886 | 20.880 | 49.711 |
| 32 | | -8.161 | 0.201 | G34 | | | | |
| 41 | Fourth Lens | 24.761 | 2.561 | T4 | Glass | 1.863 | 40.805 | 11.646 |
| 42 | | -16.109 | 2.465 | G45 | | | | |
| 80 | Ape. Stop | INFINITY | 1.390 | | | | | |
| 51 | Fifth Lens | 10.439 | 0.817 | T5 | Glass | 1.788 | 41.023 | 5.511 |
| 52 | | -7.181 | 0.000 | G58 | | | | |
| 81 | Eighth Lens | -7.181 | 0.833 | T8 | Glass | 1.886 | 20.880 | -2.615 |
| 82 | | 3.608 | 0.000 | G86 | | | | |
| 61 | Sixth Lens | 3.608 | 1.241 | T6 | Glass | 1.817 | 42.721 | 4.137 |
| 62 | | -44.924 | 0.100 | G67 | | | | |
| 71 | Seventh Lens | 6.290 | 0.886 | T7 | Glass | 1.700 | 53.867 | 9.785 |
| 72 | | 72.396 | 1.051 | G7F | | | | |
| 90 | Filter | INFINITY | 0.300 | | Glass | 1.509 | 64.166 | |
| | | INFINITY | 0.466 | | | | | |
| 95 | Cover Glass | INFINITY | 0.400 | | Glass | 1.509 | 64.166 | |
| | | INFINITY | 1.760 | | | | | |
| 91 | Image Plane | INFINITY | -0.013 | | | | | |

FIG. 24

| No. | K | $a_2$ | $a_4$ | $a_6$ |
|---|---|---|---|---|
| 41 | 0.000000E+00 | 0.000000E+00 | -1.260066E-03 | -3.668503E-05 |
| 42 | 0.000000E+00 | 0.000000E+00 | -1.141971E-03 | -2.787070E-05 |
| 62 | 0.000000E+00 | 0.000000E+00 | 5.738708E-04 | -2.170782E-05 |

| No. | $a_8$ | $a_{10}$ | $a_{12}$ |
|---|---|---|---|
| 41 | -7.144335E-07 | 3.163298E-09 | -4.395603E-09 |
| 42 | 1.417735E-07 | -2.796874E-08 | 1.753623E-09 |
| 62 | 1.061988E-05 | -9.723872E-07 | -6.165518E-09 |

FIG. 25

| Fifth Embodiment ||||||||
|---|---|---|---|---|---|---|---|
| TTL=33.686mm, EFL=1.558mm, HFOV=108.460 Degrees, ImgH=2.890mm, Fno=2.000 ||||||||
| No. | | Radius (mm) | Aperture Stop Distance/ Lens Thickness/ Air Gap (mm) | | Material | Refractive Index (Nd) | Abbe No. (Vd) | Focal length (mm) |
| | Object | INFINITY | INFINITY | | | | | |
| 11 | First Lens | 21.046 | 0.733 | T1 | Glass | 1.731 | 27.547 | -18.394 |
| 12 | | 8.087 | 6.320 | G12 | | | | |
| 21 | Second Lens | 38.517 | 1.009 | T2 | Glass | 1.610 | 35.713 | -7.998 |
| 22 | | 4.288 | 5.139 | G23 | | | | |
| 31 | Third Lens | -4.736 | 5.106 | T3 | Glass | 1.883 | 18.895 | 41.378 |
| 32 | | -6.312 | 1.544 | G34 | | | | |
| 41 | Fourth Lens | 16.685 | 1.936 | T4 | Glass | 1.863 | 40.805 | 13.164 |
| 42 | | -33.697 | 3.304 | G45 | | | | |
| 80 | Ape. Stop | INFINITY | 0.821 | | | | | |
| 51 | Fifth Lens | 8.238 | 0.500 | T5 | Glass | 1.886 | 20.880 | -4.789 |
| 52 | | 2.721 | 0.000 | G56 | | | | |
| 61 | Sixth Lens | 2.721 | 1.528 | T6 | Glass | 1.538 | 62.740 | 4.460 |
| 62 | | -16.293 | 0.100 | G67 | | | | |
| 71 | Seventh Lens | 827.074 | 1.435 | T7 | Glass | 1.509 | 64.166 | 7.773 |
| 72 | | -3.970 | 1.111 | G7F | | | | |
| 90 | Filter | INFINITY | 0.300 | | Glass | 1.509 | 64.166 | |
| | | INFINITY | 0.483 | | | | | |
| 95 | Cover Glass | INFINITY | 0.400 | | Glass | 1.509 | 64.166 | |
| | | INFINITY | 1.826 | | | | | |
| 91 | Image Plane | INFINITY | 0.090 | | | | | |

FIG. 26

| No. | K | $a_2$ | $a_4$ | $a_6$ |
|---|---|---|---|---|
| 31 | -5.354054E-02 | 0.000000E+00 | 0.000793217 | 4.814916E-05 |
| 32 | -1.144663E-01 | 0.000000E+00 | 0.000580714 | -1.147836E-06 |
| 71 | -2.026964E+08 | 0.000000E+00 | -3.634681E-03 | -6.113383E-04 |
| 72 | 1.211112E+00 | 0.000000E+00 | 6.502280E-04 | -3.608956E-04 |
| No. | $a_8$ | $a_{10}$ | $a_{12}$ | |
| 31 | -2.468788E-06 | 1.468353E-07 | | |
| 32 | 1.013815E-07 | 3.147877E-09 | | |
| 71 | 6.508025E-05 | 2.578339E-06 | -1.423067E-16 | |
| 72 | 1.444024E-04 | -2.631226E-05 | 2.504948E-06 | |

FIG. 27

| Sixth Embodiment |||||||| 
|---|---|---|---|---|---|---|---|
| TTL=32.690mm, EFL=1.812mm, HFOV=110.050 Degrees, ImgH=2.890mm, Fno=2.400 ||||||||
| No. |  | Radius (mm) | Aperture Stop Distance/ Lens Thickness/ Air Gap (mm) | | Material | Refractive Index (Nd) | Abbe No. (Vd) | Focal length (mm) |
|  | Object | INFINITY | INFINITY |  |  |  |  |
| 11 | First Lens | 29.445 | 3.316 | T1 | Glass | 1.778 | 25.477 | -14.709 |
| 12 |  | 7.836 | 1.695 | G12 |  |  |  |  |
| 21 | Second Lens | 9.640 | 1.363 | T2 | Glass | 1.938 | 16.484 | -7.063 |
| 22 |  | 3.658 | 4.645 | G23 |  |  |  |  |
| 31 | Third Lens | -4.658 | 4.113 | T3 | Glass | 1.938 | 16.484 | 31.208 |
| 32 |  | -5.736 | 0.694 | G34 |  |  |  |  |
| 41 | Fourth Lens | INFINITY | 2.488 | T4 | Glass | 1.731 | 27.547 | 28.013 |
| 42 |  | -20.491 | 3.199 | G45 |  |  |  |  |
| 80 | Ape. Stop | INFINITY | -0.199 |  |  |  |  |
| 51 | Fifth Lens | 4.615 | 0.500 | T5 | Glass | 1.938 | 16.484 | -7.176 |
| 52 |  | 2.594 | 0.000 | G56 |  |  |  |  |
| 61 | Sixth Lens | 2.594 | 4.542 | T6 | Glass | 1.514 | 59.511 | 4.203 |
| 62 |  | -5.221 | 0.235 | G67 |  |  |  |  |
| 71 | Seventh Lens | -79.767 | 2.791 | T7 | Glass | 1.509 | 64.166 | 23.084 |
| 72 |  | -10.354 | 0.282 | G7F |  |  |  |  |
| 90 | Filter | INFINITY | 0.300 |  | Glass | 1.509 | 64.166 |  |
|  |  | INFINITY | 0.469 |  |  |  |  |  |
| 95 | Cover Glass | INFINITY | 0.400 |  | Glass | 1.509 | 64.166 |  |
|  |  | INFINITY | 1.771 |  |  |  |  |  |
| 91 | Image Plane | INFINITY | 0.087 |  |  |  |  |  |

FIG. 28

| No. | K | $a_2$ | $a_4$ | $a_6$ | $a_8$ |
|---|---|---|---|---|---|
| 31 | -5.354054E-02 | 0.000000E+00 | -8.319785E-04 | -3.541615E-06 | -1.120505E-08 |
| 32 | -1.144663E-01 | 0.000000E+00 | 6.633147E-05 | 5.085475E-06 | -3.895250E-07 |
| 71 | 0.000000E+00 | 0.000000E+00 | -1.699689E-04 | 2.577782E-04 | 3.397265E-05 |
| 72 | -4.318801E+01 | 0.000000E+00 | -2.600523E-03 | 1.439894E-04 | 2.415841E-04 |

| No. | $a_{10}$ | $a_{12}$ | $a_{14}$ | $a_{16}$ |
|---|---|---|---|---|
| 31 | -4.462761E-07 | | | |
| 32 | 8.861560E-09 | | | |
| 71 | -1.181621E-06 | 5.154877E-16 | -2.720778E-18 | 1.612258E-21 |
| 72 | -4.549113E-05 | 3.490095E-06 | | |

FIG. 29

| Embodiment | 1st | 2nd | 3rd | 4th | 5th | 6th |
|---|---|---|---|---|---|---|
| T1 | 2.336 | 0.980 | 0.700 | 0.875 | 0.733 | 3.316 |
| G12 | 4.711 | 6.157 | 6.420 | 2.564 | 6.320 | 1.695 |
| T2 | 1.255 | 0.713 | 0.900 | 1.503 | 1.009 | 1.363 |
| G23 | 4.816 | 5.254 | 4.104 | 3.451 | 5.139 | 4.645 |
| T3 | 3.321 | 4.232 | 4.045 | 4.646 | 5.106 | 4.113 |
| G34 | 0.216 | 0.661 | 0.050 | 0.201 | 1.544 | 0.694 |
| T4 | 2.943 | 1.546 | 1.590 | 2.561 | 1.936 | 2.488 |
| G45 | 2.384 | 3.764 | 1.892 | 3.856 | 4.125 | 3.000 |
| T5 | 1.178 | 0.741 | 1.611 | 0.817 | 0.500 | 0.500 |
| G56 | 1.050 | 1.108 | 1.797 | 0.833 | 0.000 | 0.000 |
| T6 | 0.700 | 1.530 | 0.800 | 1.241 | 1.528 | 4.542 |
| G67 | 0.317 | 0.426 | 0.100 | 0.100 | 0.100 | 0.235 |
| T7 | 1.519 | 2.097 | 1.270 | 0.886 | 1.435 | 2.791 |
| G7F | 0.150 | 0.391 | 0.593 | 1.051 | 1.111 | 0.282 |
| TF | 0.285 | 0.300 | 0.300 | 0.300 | 0.300 | 0.300 |
| GFP | 2.665 | 2.626 | 2.802 | 2.613 | 2.798 | 2.727 |
| BFL | 3.100 | 3.316 | 3.695 | 3.964 | 4.209 | 3.309 |
| EFL | 1.481 | 1.577 | 1.583 | 1.718 | 1.558 | 1.812 |
| TTL | 29.845 | 32.525 | 28.974 | 27.499 | 33.686 | 32.690 |
| TL | 26.746 | 29.209 | 25.279 | 23.535 | 29.476 | 29.381 |
| HFOV | 119.870 | 110.000 | 110.180 | 110.000 | 108.460 | 110.050 |
| ALT | 13.251 | 11.838 | 10.916 | 12.530 | 12.247 | 19.112 |
| AAG | 13.495 | 17.371 | 14.363 | 11.005 | 17.229 | 10.269 |
| L57 | 3.245 | 3.805 | 4.308 | 2.991 | 2.128 | 5.277 |
| υ1 | 16.484 | 45.832 | 37.228 | 30.060 | 27.547 | 25.477 |
| υ2 | 31.314 | 30.053 | 42.721 | 37.370 | 35.713 | 16.484 |

FIG. 30

| Embodiment | 1st | 2nd | 3rd | 4th | 5th | 6th |
|---|---|---|---|---|---|---|
| υ1+υ2 | 47.798 | 75.885 | 79.950 | 67.430 | 63.260 | 41.960 |
| (G23+T3+T4+G45)/L57 | 4.149 | 3.889 | 2.700 | 4.852 | 7.662 | 2.700 |
| (T3+T7)/(G34+T5) | 3.473 | 4.515 | 3.200 | 5.432 | 3.200 | 5.782 |
| HFOV/(TL+EFL) | 4.247 | 3.573 | 4.102 | 4.356 | 3.495 | 3.528 |
| (G12+G23)/EFL | 6.433 | 7.236 | 6.648 | 3.501 | 7.355 | 3.499 |
| ALT/(T3+G45) | 2.323 | 1.480 | 1.839 | 1.474 | 1.327 | 2.687 |
| AAG/(G12+T3) | 1.680 | 1.672 | 1.372 | 1.526 | 1.508 | 1.768 |
| (T1+T5)/T2 | 2.800 | 2.414 | 2.568 | 1.126 | 1.222 | 2.800 |
| (T7+BFL)/T4 | 1.569 | 3.503 | 3.124 | 1.894 | 2.915 | 2.452 |
| G45/T2 | 1.900 | 5.281 | 2.102 | 2.565 | 4.088 | 2.202 |
| T3/(T2+G34) | 2.258 | 3.080 | 4.258 | 2.726 | 2.000 | 2.000 |
| TTL/(G12+G23+G45) | 2.506 | 2.143 | 2.334 | 2.786 | 2.161 | 3.500 |
| (G23+T4)/T2 | 6.184 | 9.540 | 6.327 | 4.000 | 7.011 | 5.235 |
| ALT/(T3+G67) | 3.642 | 2.541 | 2.634 | 2.640 | 2.352 | 4.396 |
| BFL/EFL | 2.093 | 2.103 | 2.334 | 2.307 | 2.702 | 1.826 |
| TL/(T2+T3+T4) | 3.557 | 4.500 | 3.868 | 2.702 | 3.661 | 3.689 |
| (T1+G56)/T6 | 4.838 | 1.365 | 3.121 | 1.376 | 0.480 | 0.730 |
| (T4+G45)/EFL | 3.597 | 3.367 | 2.199 | 3.735 | 3.890 | 3.029 |
| (G23+BFL)/(G34+T4) | 2.506 | 3.884 | 4.757 | 2.684 | 2.686 | 2.500 |

FIG. 31

OPTICAL IMAGING LENS INCLUDING SEVEN LENSES OF −−++−++ REFRACTIVE POWERS, OR EIGHT LENSES OF −−++−+−+, −−+++−+−, −−−+−+−+ OR −−+++−++ REFRACTIVE POWERS

BACKGROUND OF THE INVENTION

1. Field of the Invention

The present invention generally relates to an optical imaging lens. Specifically speaking, the present invention is directed to an optical imaging lens for use in photography in a portable electronic device such as a mobile phone, a camera, a tablet personal computer, or a personal digital assistant (PDA) for taking pictures or for recording videos.

2. Description of the Prior Art

In recent years, the application of optical imaging lenses in the field of photography in vehicle has become more and more diverse, from parking sensor, 360-degree panoramic camera, lane-shifting system to advanced driver assistance system (ADAS). In order to meet the needs of consumers better, optical imaging lenses must have good thermal stability at different temperatures. In addition, the optical imaging lens with wider viewing angle is also a trend for development.

Therefore, how to provide a vehicle optical imaging lens with better thermal stability, wide viewing angle, and imaging quality to meet the demanding purpose in vehicle is a topic for research in the field.

SUMMARY OF THE INVENTION

In the light of the above, the present invention proposes an optical imaging lens which has wide viewing angle, better thermal stability, ensured imaging quality, and is technically possible. The optical imaging lens of the present invention from an object-side to an image-side along an optical axis has a first lens element, a second lens element, a third lens element, a fourth lens element, a fifth lens element, a sixth lens element, a seventh lens element and an optional eighth lens element. The eighth lens element may be disposed between the fifth lens element and the sixth lens element. Each first lens element, second lens element, third lens element, fourth lens element, fifth lens element, sixth lens element, seventh lens element and eighth lens element respectively has an object-side surface which faces toward the object-side and allows imaging rays to pass through as well as an image-side surface which faces toward the image-side and allows the imaging rays to pass through.

In one embodiment, the first lens element is arranged to be a lens element in a first order from the object-side to the image-side and has negative refracting power; the second lens element is arranged to be a lens element in a second order from the object-side to the image-side and has negative refracting power; the third lens element is arranged to be a lens element in a third order from the object-side to the image-side and an optical axis region of the object-side surface of the third lens element is concave; the fourth lens element is arranged to be a lens element in a fourth order from the object-side to the image-side and an optical axis region of the object-side surface of the fourth lens element is convex; the fifth lens element is arranged to be a lens element in a fifth order from the object-side to the image-side and an optical axis region of the object-side surface of the fifth lens element is convex; the sixth lens element is arranged to be a lens element in a second order from the image-side to the object-side; the seventh lens element is arranged to be a lens element in a first order from the image-side to the object-side. $\upsilon 1$ is an Abbe number of the first lens element, $\upsilon 2$ is an Abbe number of the second lens element, T3 is a thickness of the third lens element along the optical axis, T4 is a thickness of the fourth lens element along the optical axis, G23 is a distance from the image-side of the second lens element to the object-side of the third lens element along the optical axis, G45 is a distance from the image-side of the fourth lens element to the object-side of the fifth lens element along the optical axis, and L57 is a distance from the object-side of the fifth lens element to the object-side of the seventh lens element along the optical axis to satisfy the relationship: $(G23+T3+T4+G45)/L57 \geq 2.700$ and $\upsilon 1+\upsilon 2 \leq 80.000$.

In another embodiment, the first lens element is arranged to be a lens element in a first order from the object-side to the image-side and has negative refracting power, the second lens element is arranged to be a lens element in a second order from the object-side to the image-side and has negative refracting power, the third lens element is arranged to be a lens element in a third order from the object-side to the image-side and an optical axis region of the object-side surface of the third lens element is concave, the fourth lens element is arranged to be a lens element in a fourth order from the object-side to the image-side, the fifth lens element is arranged to be a lens element in a fifth order from the object-side to the image-side and an optical axis region of the object-side surface of the fifth lens element is convex, the sixth lens element is arranged to be a lens element in a second order from the image-side to the object-side, the seventh lens element is arranged to be a lens element in a first order from the image-side to the object-side. T5 is a thickness of the fifth lens element along the optical axis, T7 is a thickness of the seventh lens element along the optical axis, G34 is a distance from the image-side of the third lens element to the object-side of the fourth lens element along the optical axis, and the optical imaging lens to satisfy the relationship: $(T3+T7)/(G34+T5) \geq 0.200$ and $\upsilon 1+\upsilon 2 \leq 80.000$.

In still another embodiment, the first lens element is arranged to be a lens element in a first order from the object-side to the image-side and has negative refracting power, the second lens element is arranged to be a lens element in a second order from the object-side to the image-side and has negative refracting power, the third lens element is arranged to be a lens element in a third order from the object-side to the image-side and an optical axis region of the object-side surface of the third lens element is concave, the fourth lens element is arranged to be a lens element in a fourth order from the object-side to the image-side, the fifth lens element is arranged to be a lens element in a fifth order from the object-side to the image-side and a periphery region of the object-side surface of the fifth lens element is convex, the sixth lens element is arranged to be a lens element in a second order from the image-side to the object-side, the seventh lens element is arranged to be a lens element in a first order from the image-side to the object-side. And the optical imaging lens satisfy the relationship: $(T3+T7)/(G34+T5) \geq 3.200$ and $\upsilon 1+\upsilon 2 \leq 80.000$.

In the optical imaging lens of the present invention, the embodiments may also selectively satisfy the following numerical conditions:

$(G12+G23)/EFL \geq 3.400$;      1.

$ALT/(T3+G45) \leq 2.700$;      2.

$AAG/(G12+T3) \leq 2.200$;      3.

$(T1+T5)/T2 \leq 2.800;$     4.

$(T7+BFL)/T4 \leq 3.600;$     5.

$G45/T2 \geq 1.900;$     6.

$T3/(T2+G34) \geq 2.000;$     7.

$TTL/(G12+G23+G45) \leq 3.500;$     8.

$(G23+T4)/T2 \geq 4.000;$     9.

$ALT/(T3+G67) \leq 4.800;$     10.

$BFL/EFL \geq 1.400;$     11.

$TL/(T2+T3+T4) \leq 4.500;$     12.

$(T1+G56)/T6 \leq 5.500;$     13.

$(T4+G45)/EFL \geq 2.100;$     14.

$(G23+BFL)/(G34+T4) \geq 2.500;$     15.

$HFOV/(TL+EFL) \geq 3.000°/mm;$     16.

In which, T1 is a thickness of the first lens element along the optical axis; T2 is a thickness of the second lens element along the optical axis; T6 is a thickness of the sixth lens element along the optical axis. G12 is a distance from the image-side of the first lens element to the object-side of the second lens element along the optical axis; G56 is a distance from the image-side of the fifth lens element to the object-side of the sixth lens element along the optical axis; G67 is a distance from the image-side of the sixth lens element to the object-side of the seventh lens element along the optical axis. ALT is a sum of thicknesses of the first lens element, the second lens element, the third lens element, the fourth lens element, the fifth lens element, the sixth lens element and the seventh lens element along the optical axis. TL is a distance from the object-side surface of the first lens element to the image-side surface of the seventh lens element along the optical axis. TTL is a distance from the object-side surface of the first lens element to an image plane along the optical axis, and that is the system length of the optical imaging lens. BFL is a distance from the image-side surface of the seventh lens element to the image plane along the optical axis. AAG is a sum of a distance from the image-side of the first lens element to the object-side of the second lens element, a distance from the image-side of the second lens element to the object-side of the third lens element, a distance from the image-side of the third lens element to the object-side of the fourth lens element, a distance from the image-side of the fourth lens element to the object-side of the fifth lens element, a distance from the image-side of the fifth lens element to the object-side of the sixth lens element and a distance from the image-side of the sixth lens element to the object-side of the seventh lens element along the optical axis. EFL is an effective focal length of the optical imaging lens. HFOV stands for the half field of view of the optical imaging lens. ImgH is an image height of the optical imaging lens. Fno is the f-number of the optical imaging lens.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 18 shows the optical data of the first embodiment of the optical imaging lens.

FIG. 19 shows the aspheric surface data of the first embodiment.

FIG. 20 shows the optical data of the second embodiment of the optical imaging lens.

FIG. 21 shows the aspheric surface data of the second embodiment.

FIG. 22 shows the optical data of the third embodiment of the optical imaging lens.

FIG. 23 shows the aspheric surface data of the third embodiment.

FIG. 24 shows the optical data of the fourth embodiment of the optical imaging lens.

FIG. 25 shows the aspheric surface data of the fourth embodiment.

FIG. 26 shows the optical data of the fifth embodiment of the optical imaging lens.

FIG. 27 shows the aspheric surface data of the fifth embodiment.

FIG. 28 shows the optical data of the sixth embodiment of the optical imaging lens.

FIG. 29 shows the aspheric surface data of the sixth embodiment.

FIG. 30 shows some important ratios in the embodiments.
FIG. 31 shows some important ratios in the embodiments.

DETAILED DESCRIPTION

The terms "optical axis region", "periphery region", "concave", and "convex" used in this specification and claims should be interpreted based on the definition listed in the specification by the principle of lexicographer.

Figure 1:
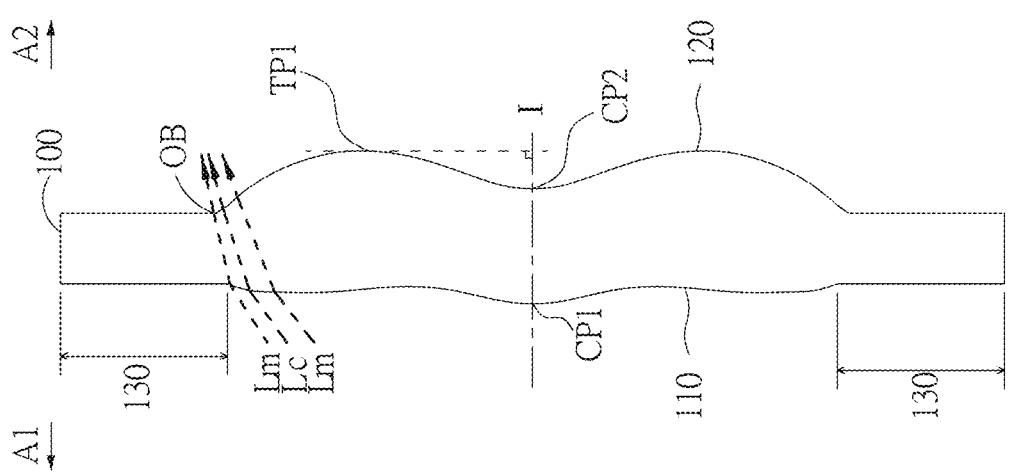

In the present disclosure, the optical system may comprise at least one lens element to receive imaging rays that are incident on the optical system over a set of angles ranging from parallel to an optical axis to a half field of view (HFOV) angle with respect to the optical axis. The imaging rays pass through the optical system to produce an image on an image plane. The term "a lens element having positive refracting power (or negative refracting power)" means that the paraxial refracting power of the lens element in Gaussian optics is positive (or negative). The term "an object-side (or image-side) surface of a lens element" refers to a specific region of that surface of the lens element at which imaging rays can pass through that specific region. Imaging rays include at least two types of rays: a chief ray Lc and a marginal ray Lm (as shown in FIG. 1). An object-side (or image-side) surface of a lens element can be characterized as having several regions, including an optical axis region, a periphery region, and, in some cases, one or more intermediate regions, as discussed more fully below.

Figure 4:
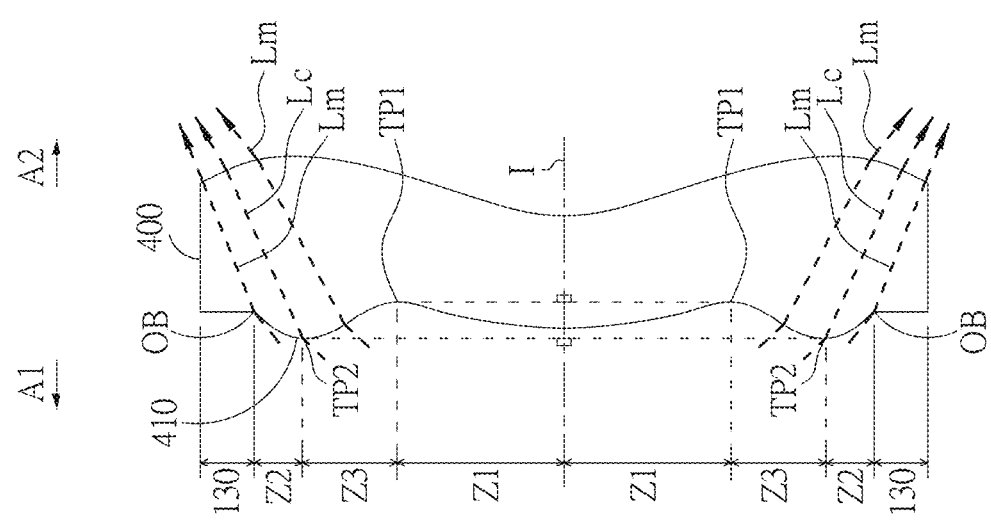

FIG. 1 is a radial cross-sectional view of a lens element 100. Two referential points for the surfaces of the lens element 100 can be defined: a central point, and a transition point. The central point of a surface of a lens element is a point of intersection of that surface and the optical axis I. As illustrated in FIG. 1, a first central point CP1 may be present on the object-side surface 110 of lens element 100 and a second central point CP2 may be present on the image-side surface 120 of the lens element 100. The transition point is a point on a surface of a lens element, at which the line tangent to that point is perpendicular to the optical axis I. The optical boundary OB of a surface of the lens element is defined as a point at which the radially outermost marginal ray Lm passing through the surface of the lens element intersects the surface of the lens element. All transition points lie between the optical axis I and the optical boundary OB of the surface of the lens element. If multiple transition points are present on a single surface, then these transition points are sequentially named along the radial direction of the surface with reference numerals starting from the first transition point. For example, the first transition point, e.g., TP1, (closest to the optical axis I), the second transition point, e.g., TP2, (as shown in FIG. 4), and the Nth transition point (farthest from the optical axis I).

The region of a surface of the lens element from the central point to the first transition point TP1 is defined as the optical axis region, which includes the central point. The region located radially outside of the farthest Nth transition point from the optical axis I to the optical boundary OB of the surface of the lens element is defined as the periphery region. In some embodiments, there may be intermediate regions present between the optical axis region and the periphery region, with the number of intermediate regions depending on the number of the transition points.

The shape of a region is convex if a collimated ray being parallel to the optical axis I and passing through the region is bent toward the optical axis I such that the ray intersects the optical axis I on the image side A2 of the lens element. The shape of a region is concave if the extension line of a collimated ray being parallel to the optical axis I and passing through the region intersects the optical axis I on the object side A1 of the lens element.

Additionally, referring to FIG. 1, the lens element 100 may also have a mounting portion 130 extending radially outward from the optical boundary OB. The mounting portion 130 is typically used to physically secure the lens element to a corresponding element of the optical system (not shown). Imaging rays do not reach the mounting portion 130. The structure and shape of the mounting portion 130 are only examples to explain the technologies, and should not be taken as limiting the scope of the present disclosure. The mounting portion 130 of the lens elements discussed below may be partially or completely omitted in the following drawings.

Figure 2:
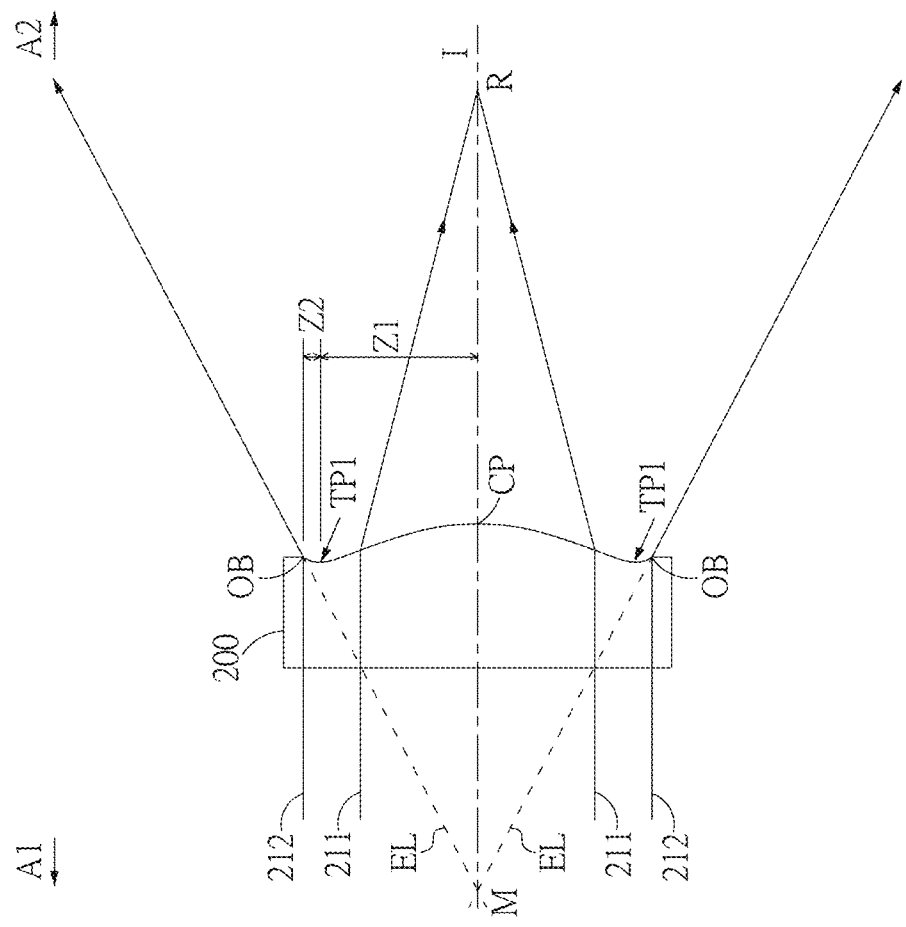
FIGS. 1-5 illustrates the methods for determining the surface shapes and for determining one region is the optical axis region or the periphery region of one lens element.

Referring to FIG. 2, optical axis region Z1 is defined between central point CP and first transition point TP1. Periphery region Z2 is defined between TP1 and the optical boundary OB of the surface of the lens element. Collimated ray 211 intersects the optical axis I on the image side A2 of lens element 200 after passing through optical axis region Z1, i.e., the focal point of collimated ray 211 after passing through optical axis region Z1 is on the image side A2 of the lens element 200 at point R in FIG. 2. Accordingly, since the ray itself intersects the optical axis I on the image side A2 of the lens element 200, optical axis region Z1 is convex. On the contrary, collimated ray 212 diverges after passing through periphery region Z2. The extension line EL of collimated ray 212 after passing through periphery region Z2 intersects the optical axis I on the object side A1 of lens element 200, i.e., the focal point of collimated ray 212 after passing through periphery region Z2 is on the object side A1 at point M in FIG. 2. Accordingly, since the extension line EL of the ray intersects the optical axis I on the object side A1 of the lens element 200, periphery region Z2 is concave. In the lens element 200 illustrated in FIG. 2, the first transition point TP1 is the border of the optical axis region and the periphery region, i.e., TP1 is the point at which the shape changes from convex to concave.

Alternatively, there is another way for a person having ordinary skill in the art to determine whether an optical axis region is convex or concave by referring to the sign of "Radius" (the "R" value), which is the paraxial radius of shape of a lens surface in the optical axis region. The R value is commonly used in conventional optical design software such as Zemax and CodeV. The R value usually appears in the lens data sheet in the software. For an object-side surface, a positive R value defines that the optical axis region of the object-side surface is convex, and a negative R value defines that the optical axis region of the object-side surface is concave. Conversely, for an image-side surface, a positive R value defines that the optical axis region of the image-side surface is concave, and a negative R value defines that the optical axis region of the image-side surface is convex. The result found by using this method should be consistent with the method utilizing intersection of the optical axis by rays/extension lines mentioned above, which determines surface shape by referring to whether the focal point of a collimated ray being parallel to the optical axis I is on the object-side or the image-side of a lens element. As used herein, the terms "a shape of a region is convex (concave)," "a region is convex (concave)," and "a convex-(concave-) region," can be used alternatively.

Figure 5:
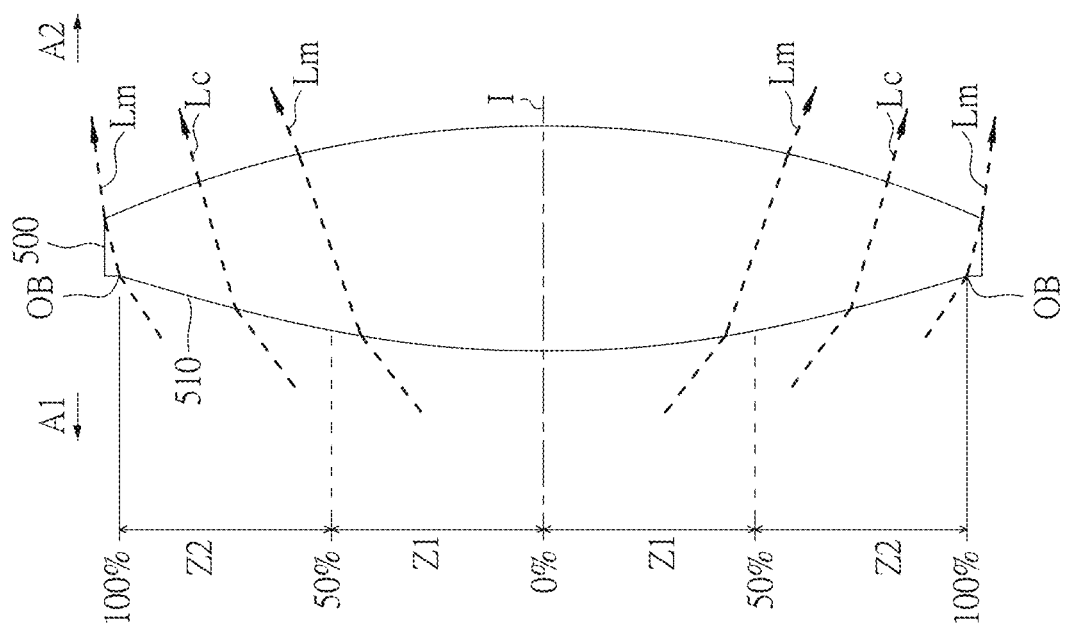
Figure 3:
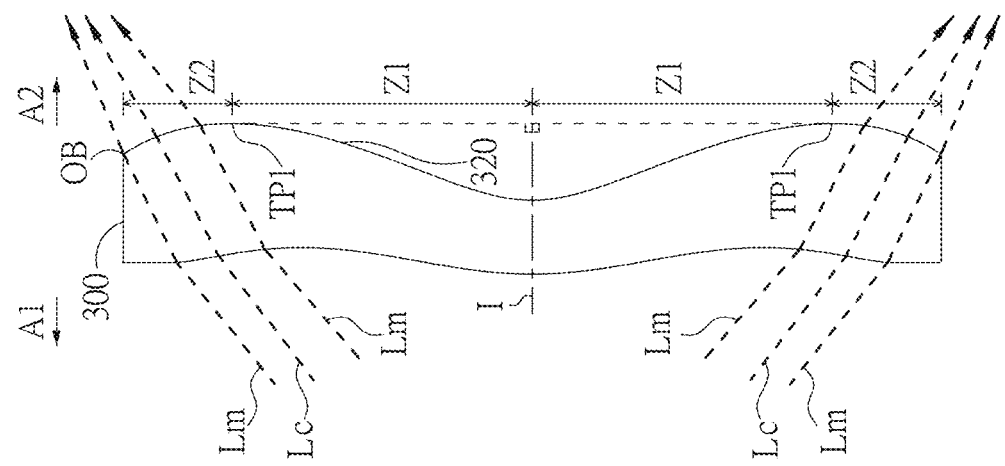

FIG. 3, FIG. 4 and FIG. 5 illustrate examples of determining the shape of lens element regions and the boundaries of regions under various circumstances, including the optical axis region, the periphery region, and intermediate regions as set forth in the present specification.

FIG. 3 is a radial cross-sectional view of a lens element 300. As illustrated in FIG. 3, only one transition point TP1 appears within the optical boundary OB of the image-side surface 320 of the lens element 300. Optical axis region Z1 and periphery region Z2 of the image-side surface 320 of lens element 300 are illustrated. The R value of the image-side surface 320 is positive (i.e., R>0). Accordingly, the optical axis region Z1 is concave.

In general, the shape of each region demarcated by the transition point will have an opposite shape to the shape of the adjacent region(s). Accordingly, the transition point will define a transition in shape, changing from concave to convex at the transition point or changing from convex to concave. In FIG. 3, since the shape of the optical axis region Z1 is concave, the shape of the periphery region Z2 will be convex as the shape changes at the transition point TP1.

FIG. 4 is a radial cross-sectional view of a lens element 400. Referring to FIG. 4, a first transition point TP1 and a second transition point TP2 are present on the object-side surface 410 of lens element 400. The optical axis region Z1 of the object-side surface 410 is defined between the optical axis I and the first transition point TP1. The R value of the object-side surface 410 is positive (i.e., R>0). Accordingly, the optical axis region Z1 is convex.

The periphery region Z2 of the object-side surface 410, which is also convex, is defined between the second transition point TP2 and the optical boundary OB of the object-side surface 410 of the lens element 400. Further, intermediate region Z3 of the object-side surface 410, which is concave, is defined between the first transition point TP1 and the second transition point TP2. Referring once again to FIG. 4, the object-side surface 410 includes an optical axis region Z1 located between the optical axis I and the first transition point TP1, an intermediate region Z3 located between the first transition point TP1 and the second transition point TP2, and a periphery region Z2 located between the second transition point TP2 and the optical boundary OB of the object-side surface 410. Since the shape of the optical axis region Z1 is designed to be convex, the shape of the intermediate region Z3 is concave as the shape of the intermediate region Z3 changes at the first transition point TP1, and the shape of the periphery region Z2 is convex as the shape of the periphery region Z2 changes at the second transition point TP2.

FIG. 5 is a radial cross-sectional view of a lens element 500. Lens element 500 has no transition point on the object-side surface 510 of the lens element 500. For a surface of a lens element with no transition point, for example, the object-side surface 510 the lens element 500, the optical axis region Z1 is defined as the region between 0-50% of the distance between the optical axis I and the optical boundary OB of the surface of the lens element and the periphery region is defined as the region between 50%-100% of the distance between the optical axis I and the optical boundary OB of the surface of the lens element. Referring to lens element 500 illustrated in FIG. 5, the optical axis region Z1 of the object-side surface 510 is defined between the optical axis I and 50% of the distance between the optical axis I and the optical boundary OB. The R value of the object-side surface 510 is positive (i.e., R>0). Accordingly, the optical axis region Z1 is convex. For the object-side surface 510 of the lens element 500, because there is no transition point, the periphery region Z2 of the object-side surface 510 is also convex. It should be noted that lens element 500 may have a mounting portion (not shown) extending radially outward from the periphery region Z2.

Figure 6:
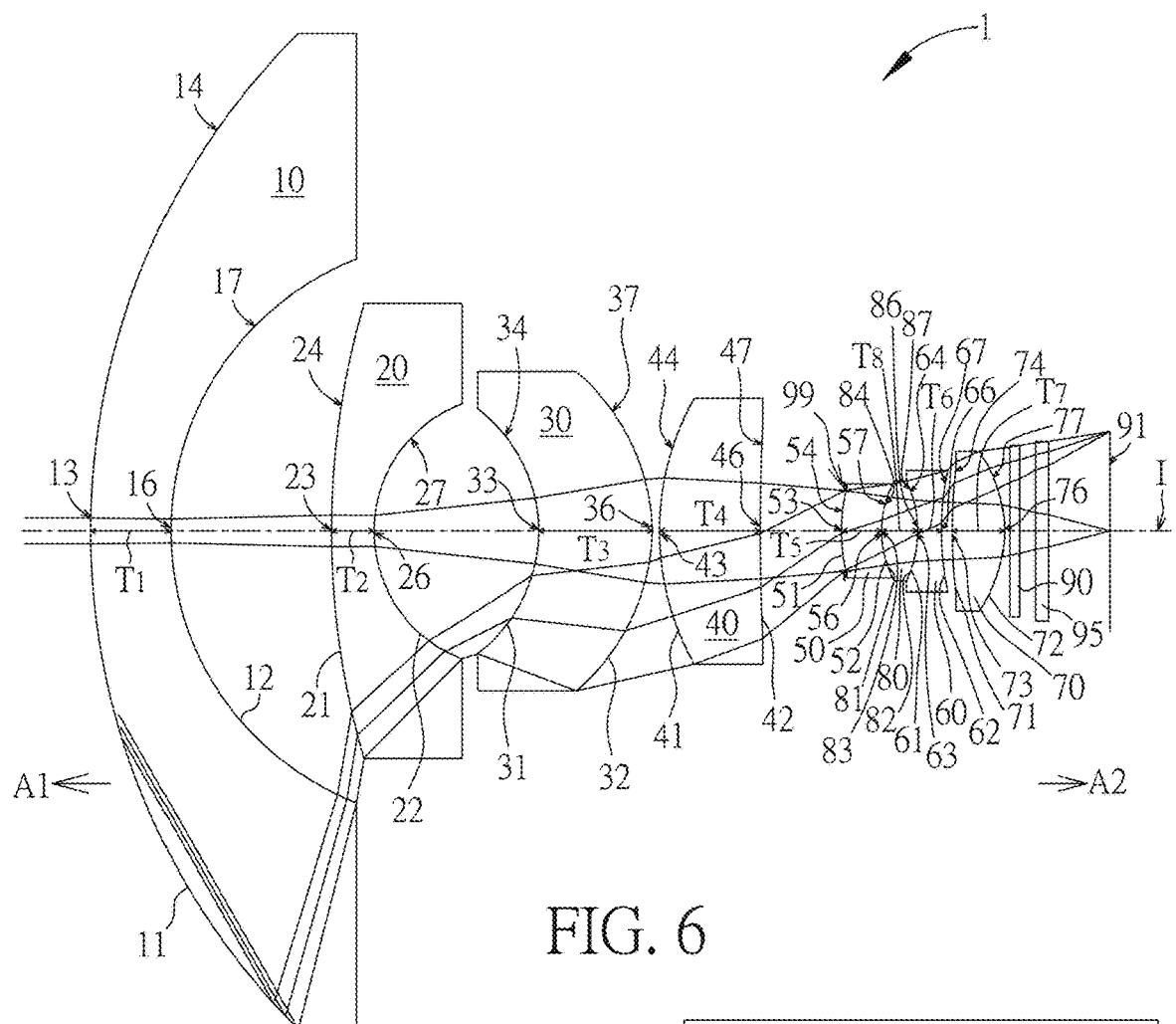
FIG. 6 illustrates a first embodiment of the optical imaging lens of the present invention.

As shown in FIG. 6, the optical imaging lens 1 of eight lens elements of the present embodiment, sequentially located from an object-side A1 (where an object is located) to an image-side A2 along an optical axis I, has a first lens element 10, a second lens element 20, a third lens element 30, a fourth lens element 40, an aperture stop 99, a fifth lens element 50, an eighth lens element 80, a sixth lens element 60, a seventh lens element 70 and an image plane 91. Generally speaking, the first lens element 10, the second lens element 20, the third lens element 30, the fourth lens element 40, the fifth lens element 50, the sixth lens element 60, the seventh lens element 70 and the eighth lens element 80 may be made of a transparent glass material but the present invention is not limited to this, and each lens element has an appropriate refracting power. In the present embodiment, lens elements having refracting power included by the optical imaging lens 1 are only the eight lens elements (the first lens element 10, the second lens element 20, the third lens element 30, the fourth lens element 40, the fifth lens element 50, the sixth lens element 60, the seventh lens element 70 and the eighth lens element 80) described above. The optical axis I is the optical axis of the entire optical imaging lens 1, and the optical axis of each of the lens elements coincides with the optical axis of the optical imaging lens 1.

Furthermore, the optical imaging lens 1 includes an aperture stop (ape. stop) 99 disposed in an appropriate position. In FIG. 6, the aperture stop 99 is disposed between the fourth lens element 40 and the fifth lens element 50. When imaging rays emitted or reflected by an object (not shown) which is located at the object-side A1 enters the optical imaging lens 1 of the present invention, it forms a clear and sharp image on the image plane 91 at the image-side A2 after passing through the first lens element 10, the second lens element 20, the third lens element 30, the fourth lens element 40, the aperture stop 99, the fifth lens element 50, the eighth lens element 80, the sixth lens element 60, the seventh lens element 70, the filter 90 and cover glass 95. In one embodiment, the filter 90 may be a filter of various suitable functions to filter out light of a specific wavelength, for example, the filter 90 may be an infrared cut filter (IR cut filter), placed between the image-side surface 72 of the seventh lens element 70 and the image plane 91, to prevent infrared light in the imaging rays from reaching the image plane 91 to adversely affect the resultant imaging quality. The filter 90 may selectively filter out light of a specific wavelength, for example, a wavelength between 780 nm and 920 nm and a wavelength longer than 960 nm but the present invention is not limited to this.

The first lens element 10, the second lens element 20, the third lens element 30, the fourth lens element 40, the fifth lens element 50, the sixth lens element 60, the seventh lens element 70 and the eighth lens element 80 of the optical imaging lens 1 each has an object-side surface 11, 21, 31, 41, 51, 61, 71 and 81 facing toward the object-side A1 and allowing imaging rays to pass through as well as an image-side surface 12, 22, 32, 42, 52, 62, 72 and 82 facing toward the image-side A2 and allowing the imaging rays to pass through. Every object-side surface and every image-side surface has an optical axis region and a periphery region.

Each lens element in the optical imaging lens 1 of the present invention further has a thickness T along the optical axis I. For embodiment, the first lens element 10 has a first lens element thickness T1, the second lens element 20 has a second lens element thickness T2, the third lens element 30 has a third lens element thickness T3, the fourth lens element 40 has a fourth lens element thickness T4, the fifth lens element 50 has a fifth lens element thickness T5, the sixth lens element 60 has a sixth lens element thickness T6, the seventh lens element 70 has a seventh lens element thickness T7, and the eighth lens element 80 has an eighth lens element thickness T8. A sum of the thicknesses of the first lens element 10, the second lens element 20, the third lens element 30, the fourth lens element 40, the fifth lens element 50, the sixth lens element 60 and the seventh lens element 70 in the optical imaging lens 1 along the optical axis I is ALT=T1+T2+T3+T4+T5+T6+T7.

In addition, between two adjacent lens elements in the optical imaging lens 1 of the present invention there may be a distance along the optical axis I. In embodiments, a sum of a distance G12 from the image-side 12 of the first lens element 10 to the object-side 21 of the second lens element 20, a distance G23 from the image-side 22 of the second lens element 20 to the object-side 31 of the third lens element 30, a distance G34 from the image-side 32 of the third lens element 30 to the object-side 41 of the fourth lens element 40, a distance G45 from the image-side 42 of the fourth lens element 40 to the object-side 51 of the fifth lens element 50, a distance G56 from the image-side 52 of the fifth lens element 50 to the object-side 61 of the sixth lens element 60 as well as a distance G67 from the image-side 62 of the sixth lens element 60 to the object-side 71 of the seventh lens element 70. Therefore, a sum of all six distances from the first lens element 10 to the seventh lens element 70 along the optical axis I is AAG=G12+G23+G34+G45+G56+G67. G58 is a distance from the image-side 52 of the fifth lens element 50 to the object-side 81 of the eighth lens element 80 along the optical axis I. G86 is a distance from the image-side 82 of the eighth lens element 80 to the object-side 61 of the sixth lens element 60 along the optical axis I. L57 is a distance from the object-side 51 of the fifth lens element 50 to the object-side 71 of the seventh lens element 70 along the optical axis I.

In addition, a distance from the object-side surface 11 of the first lens element 10 to the image plane 91, namely a system length of the optical imaging lens 1 along the optical axis I is TTL; an effective focal length of the optical imaging lens is EFL; a distance from the object-side surface 11 of the first lens element 10 to the image-side surface 72 of the seventh lens element 70 along the optical axis I is TL. HFOV stands for the half field of view which is half of the field of view of the optical imaging lens 1; ImgH is an image height of the optical imaging lens 1, and Fno is the f-number of the optical imaging lens 1.

When the filter 90 is placed between the seventh lens element 70 and the image plane 91, an air gap between the seventh lens element 70 and the filter 90 along the optical axis I is G7F; a thickness of the filter 90 along the optical axis I is TF; an air gap between the filter 90 and the image plane 91 along the optical axis I is GFP; and a distance from the image-side surface 72 of the seventh lens element 70 to the image plane 91 along the optical axis I is BFL. Therefore, BFL=G7F+TF+GFP.

Furthermore to be defined, an Abbe number of the first lens element 10 is $\upsilon 1$; an Abbe number of the second lens element 20 is $\upsilon 2$; an Abbe number of the third lens element 30 is $\upsilon 3$; and an Abbe number of the fourth lens element 40 is $\upsilon 4$; an Abbe number of the fifth lens element 50 is $\upsilon 5$; an Abbe number of the sixth lens element 60 is $\upsilon 6$, an Abbe number of the seventh lens element 70 is $\upsilon 7$ and an Abbe number of the eighth lens element 80 is $\upsilon 8$.

First Embodiment

Figures 7A, 7B, 7C, 7D:
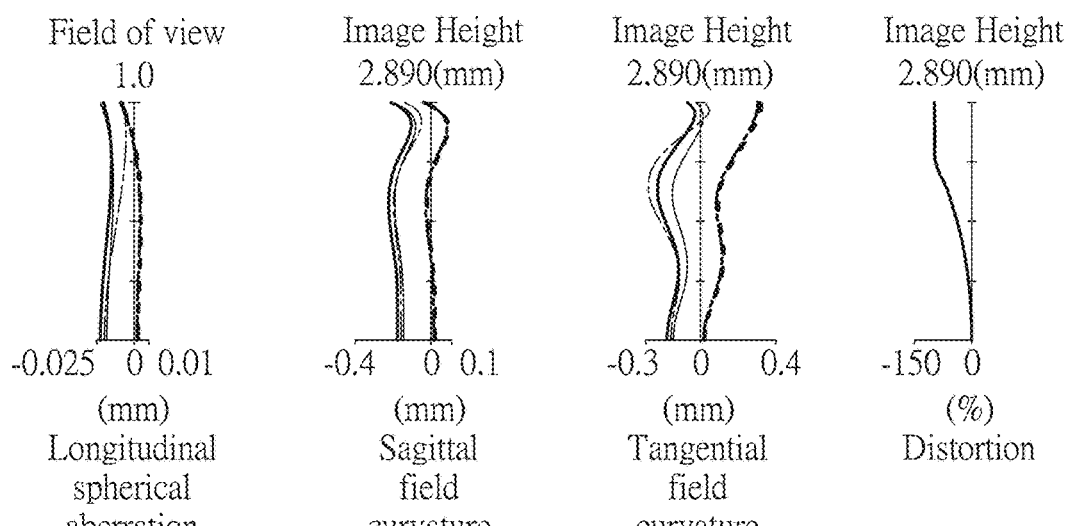
FIG. 7A illustrates the longitudinal spherical aberration on the image plane of the first embodiment.
FIG. 7B illustrates the field curvature on the sagittal direction of the first embodiment.
FIG. 7C illustrates the field curvature on the tangential direction of the first embodiment.
FIG. 7D illustrates the distortion of the first embodiment.

Please refer to FIG. 6 which illustrates the first embodiment of the optical imaging lens 1 of the present invention. Please refer to FIG. 7A for the longitudinal spherical aberration on the image plane 91 of the first embodiment; please refer to FIG. 7B for the field curvature aberration on the sagittal direction; please refer to FIG. 7C for the field curvature aberration on the tangential direction; and please refer to FIG. 7D for the distortion aberration. The Y axis of the spherical aberration in each embodiment is "field of view" for 1.0. The Y axis of the field curvature aberration and the distortion aberration in each embodiment stands for the "image height" (ImgH), which is 2.890 mm.

In this embodiment, the optical imaging lens 1 of the first embodiment exclusively has eight lens elements 10, 20, 30, 40, 50, 60, 70 and 80 with refracting power. The optical imaging lens 1 also has an aperture stop 99, a filter 90, an image plane 91 and cover glass 95. The aperture stop 99 is provided between the fourth lens element 40 and the fifth lens element 50.

The first lens element 10 is arranged to be a lens element in a first order from the object-side A1 to the image-side A2. The first lens element 10 has negative refracting power. An optical axis region 13 and a periphery region 14 of the object-side surface 11 of the first lens element 10 are convex. An optical axis region 16 and a periphery region 17 of the image-side surface 12 of the first lens element 10 are concave. Besides, the object-side surface 11 and the image-side surface 12 of the first lens element 10 may be spherical surfaces, but it is not limited thereto.

The second lens element 20 is arranged to be a lens element in a second order from the object-side A1 to the image-side A2. The second lens element 20 has negative refracting power. An optical axis region 23 and a periphery region 24 of the object-side surface 21 of the second lens element 20 are convex. An optical axis region 26 and a periphery region 27 of the image-side surface 22 of the second lens element 20 are concave. Besides, the object-side surface 21 and the image-side surface 22 of the second lens element 20 may be spherical surfaces, but it is not limited thereto.

The third lens element 30 is arranged to be a lens element in a third order from the object-side A1 to the image-side A2. The third lens element 30 has positive refracting power. An optical axis region 33 and a periphery region 34 of the object-side surface 31 of the third lens element 30 are concave. An optical axis region 36 and a periphery region 37 of the image-side surface 32 of the third lens element 30 are convex. Besides, the object-side surface 31 and the image-side surface 32 of the third lens element 30 may be aspherical surfaces, but it is not limited thereto.

The fourth lens element 40 is arranged to be a lens element in a fourth order from the object-side A1 to the image-side A2. The fourth lens element 40 has positive refracting power. An optical axis region 43 and a periphery region 44 of the object-side surface 41 of the fourth lens element 40 are convex. An optical axis region 46 and a periphery region 47 of the image-side surface 42 of the fourth lens element 40 are concave. Besides, the object-side surface 41 and the image-side surface 42 of the fourth lens element 40 may be spherical surfaces, but it is not limited thereto.

The fifth lens element 50 is arranged to be a lens element in a fifth order from the object-side A1 to the image-side A2. The fifth lens element 50 has negative refracting power. An optical axis region 53 and a periphery region 54 of the object-side surface 51 of the fifth lens element 50 are convex. An optical axis region 56 and a periphery region 57 of the image-side surface 52 of the fifth lens element 50 are concave. Besides, the object-side surface 51 and the image-side surface 52 of the fifth lens element 50 may be spherical surfaces, but it is not limited thereto.

The eighth lens element 80 is disposed between the fifth lens element 50 and the sixth lens element 60. The eighth lens element 80 has positive refracting power. An optical axis region 83 and a periphery region 84 of the object-side surface 81 of the eighth lens element 80 are convex. An optical axis region 86 and a periphery region 87 of the image-side surface 82 of the eighth lens element 80 are convex. Besides, the object-side surface 81 and the image-side surface 82 of the eighth lens element 80 may be spherical surfaces, but it is not limited thereto.

The sixth lens element 60 is arranged to be a lens element in a second order from the image-side A2 to the object-side A1. The sixth lens element 60 has negative refracting power. An optical axis region 63 and a periphery region 64 of the object-side surface 61 of the sixth lens element 60 are concave. An optical axis region 66 and a periphery region 67 of the image-side surface 62 of the sixth lens element 60 are concave. Besides, the object-side surface 61 and the image-side surface 62 of the sixth lens element 60 may be spherical surfaces, but it is not limited thereto.

The seventh lens element 70 is arranged to be a lens element in a first order from the image-side A2 to the object-side A1. The seventh lens element has positive refracting power. An optical axis region 73 and a periphery region 74 of the object-side surface 71 of the seventh lens element 70 are convex. An optical axis region 76 and a periphery region 77 of the image-side surface 72 of the seventh lens element 70 are convex. Besides, the object-side surface 71 and the image-side 72 of the seventh lens element 70 may be aspherical surfaces, but it is not limited thereto.

In the first lens element 10, the second lens element 20, the third lens element 30, the fourth lens element 40, the fifth lens element 50, the eighth lens element 80, the sixth lens element 60 and the seventh lens element 70 of the optical imaging lens element 1 of the present invention, there are 16 surfaces, such as the object-side surfaces 11/21/31/41/51/81/61/71 and the image-side surfaces 12/22/32/42/52/82/62/72. If a surface is aspherical, these aspheric coefficients are defined according to the following formula:

$$Z(Y) = \frac{Y^2}{R} \bigg/ \left(1 + \sqrt{1-(1+K)\frac{Y^2}{R^2}}\right) + \sum_{i=1}^{n} a_{2i} \times Y^{2i}$$

In which:
Y represents a vertical distance from a point on the aspherical surface to the optical axis I;
Z represents the depth of an aspherical surface (the perpendicular distance between the point of the aspherical surface at a distance Y from the optical axis I and the tangent plane of the vertex on the optical axis I of the aspherical surface);
R represents the curvature radius of the lens element surface adjacent to the optical axis I;
K is a conic constant; and
$a_{2i}$ is the aspheric coefficient of the $2i^{th}$ order.

The optical data of the first embodiment of the optical imaging lens 1 are shown in FIG. 18 while the aspheric surface data are shown in FIG. 19. The optical design of the first embodiment has good thermal stability. Normal temperature 20° C. is set to be a standard. A back focal shift at this temperature is 0.000 mm. The back focal shift is −0.006 mm when the temperature is raised to 80° C. and the back focal shift is 0.001 mm when the temperature is dropped to −40° C. In the following embodiments of the optical imaging lens, the f-number of the optical imaging lens is Fno, EFL is the effective focal length, HFOV stands for the half field of view of the optical imaging lens, and the unit for back focal shift, the image height, the radius, the thickness and the focal length is in millimeters (mm). In this embodiment, EFL=1.481 mm; HFOV=119.870 degrees; TTL=29.845 mm; Fno=2.000; ImgH=2.890 mm.

Second Embodiment

Figure 8:
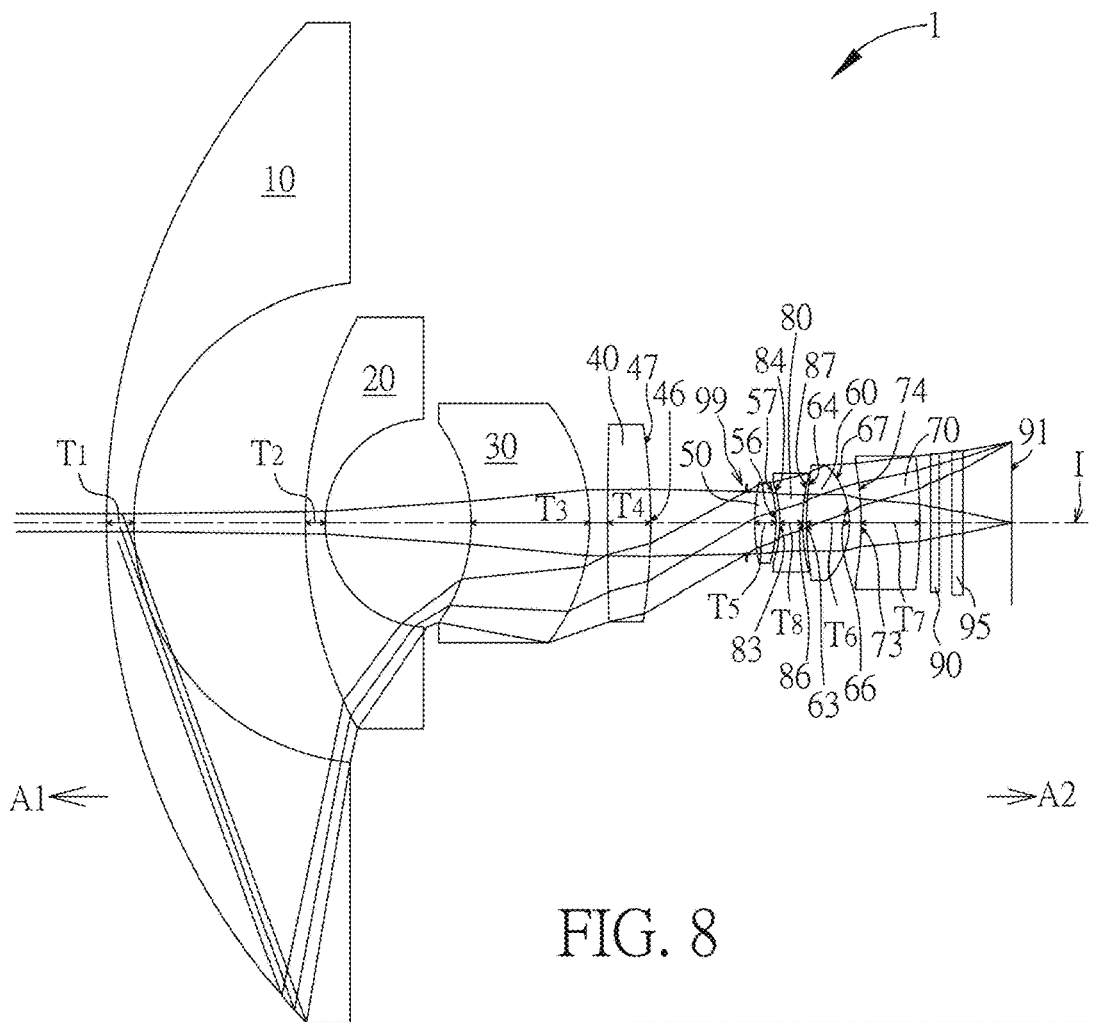
FIG. 8 illustrates a second embodiment of the optical imaging lens of the present invention.
Figures 9A, 9B, 9C, 9D:
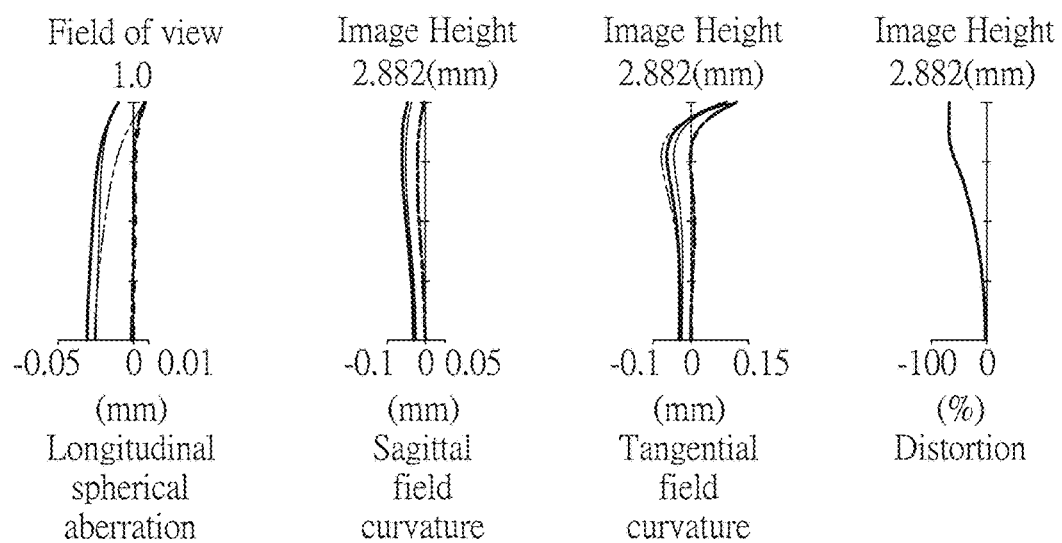
FIG. 9A illustrates the longitudinal spherical aberration on the image plane of the second embodiment.
FIG. 9B illustrates the field curvature on the sagittal direction of the second embodiment.
FIG. 9C illustrates the field curvature on the tangential direction of the second embodiment.
FIG. 9D illustrates the distortion of the second embodiment.

Please refer to FIG. 8 which illustrates the second embodiment of the optical imaging lens 1 of the present invention. It is noted that from the second embodiment to the following embodiments, in order to simplify the figures, only the components different from what the first embodiment has, and the basic lens elements will be labeled in figures. Other components that are the same as what the first embodiment has, such as a convex surface or a concave surface, are omitted in the following embodiments. Please refer to FIG. 9A for the longitudinal spherical aberration on the image plane 91 of the second embodiment, please refer to FIG. 9B for the field curvature aberration on the sagittal direction, please refer to FIG. 9C for the field curvature aberration on the tangential direction, and please refer to FIG. 9D for the distortion aberration. The components in this embodiment are similar to those in the first embodiment, but the optical data such as the refracting power, the radius, the lens thickness, the aspheric surface or the back focal length in this embodiment are different from the optical data in the first embodiment. Besides, in this embodiment, the optical axis region 46 and the periphery region 47 of the image-side surface 42 of the fourth lens element 40 are convex, the fifth lens element 50 has positive refracting power, the optical axis region 56 and the periphery region 57 of the image-side surface 52 of the fifth lens element 50 are convex, the sixth lens element 60 has positive refracting power, the optical axis region 63 and the periphery region 64 of the object-side surface 61 of the sixth lens element 60 are convex, the optical axis region 66 and the periphery region 67 of the image-side surface 62 of the sixth lens element 60 are convex, the seventh lens element 70 has negative refracting power, the optical axis region 73 and the periphery region 74 of the object-side surface 71 of the seventh lens element 70 are concave, the eighth lens element 80 has negative refracting power, the optical axis region 83 and the periphery region 84 of the object-side surface 81 of the eighth lens element 80 are concave, and the optical axis region 86 and the periphery region 87 of the image-side surface 82 of the eighth lens element 80 are concave.

The optical data of the second embodiment of the optical imaging lens are shown in FIG. 20 while the aspheric surface data are shown in FIG. 21. The optical design of the embodiment has good thermal stability. Normal temperature 20° C. is set to be a standard. A back focal shift at this temperature is 0.000 mm. The back focal shift is −0.004 mm when the temperature is raised to 80° C. and the back focal shift is 0.003 mm when the temperature is dropped to −40° C. In this embodiment, EFL=1.577 mm; HFOV=110.000 degrees; TTL=32.525 mm; Fno=2.400; ImgH=2.882 mm. In particular, 1) the field curvature aberration on the sagittal direction of the optical imaging lens in this embodiment is better than that of the optical imaging lens in the first embodiment, 2) the field curvature aberration on the tangential direction of the optical imaging lens in this embodiment is better than that of the optical imaging lens in the first embodiment, and 3) the distortion aberration of the optical imaging lens in this embodiment is better than that of the optical imaging lens in the first embodiment.

Third Embodiment

Figure 10:
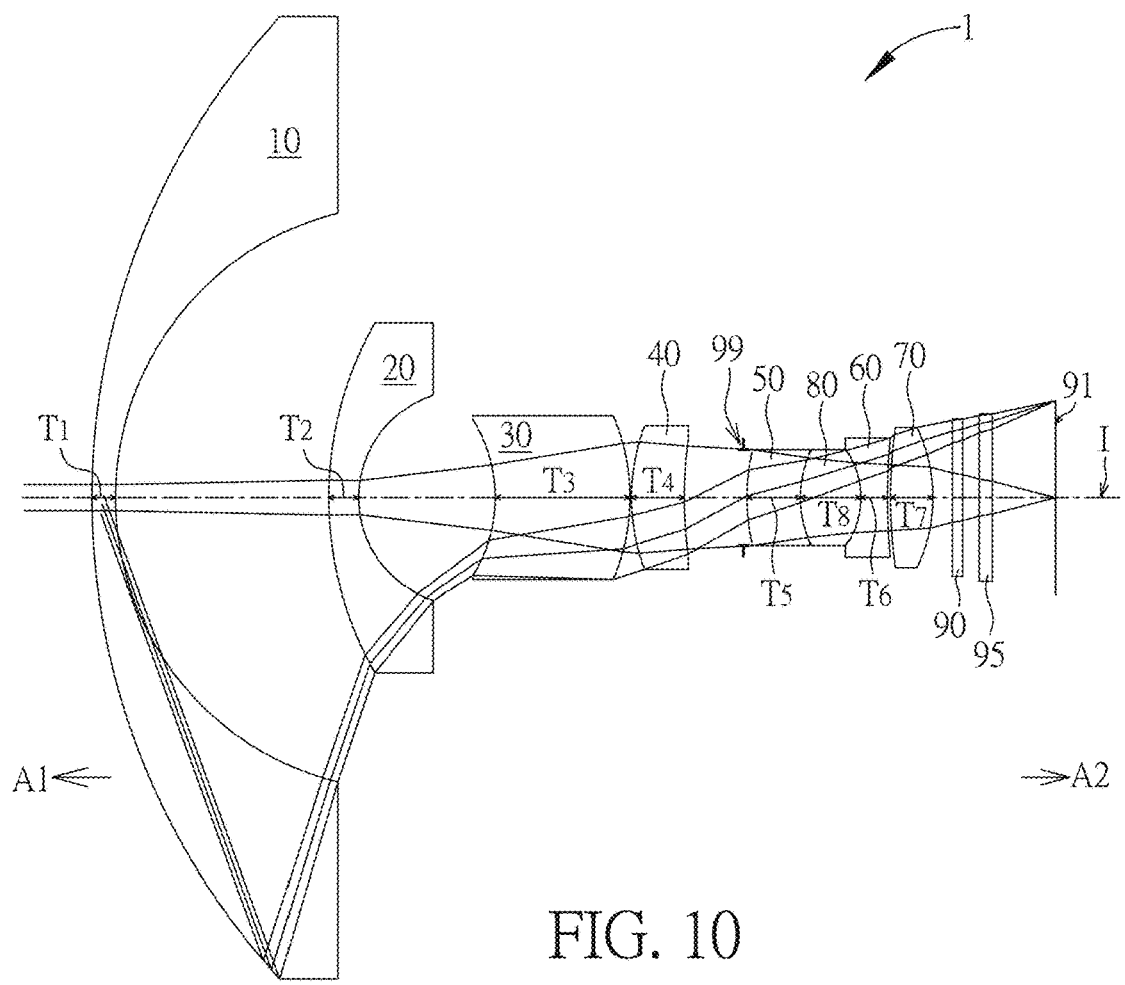
FIG. 10 illustrates a third embodiment of the optical imaging lens of the present invention.
Figures 11A, 11B, 11C, 11D:
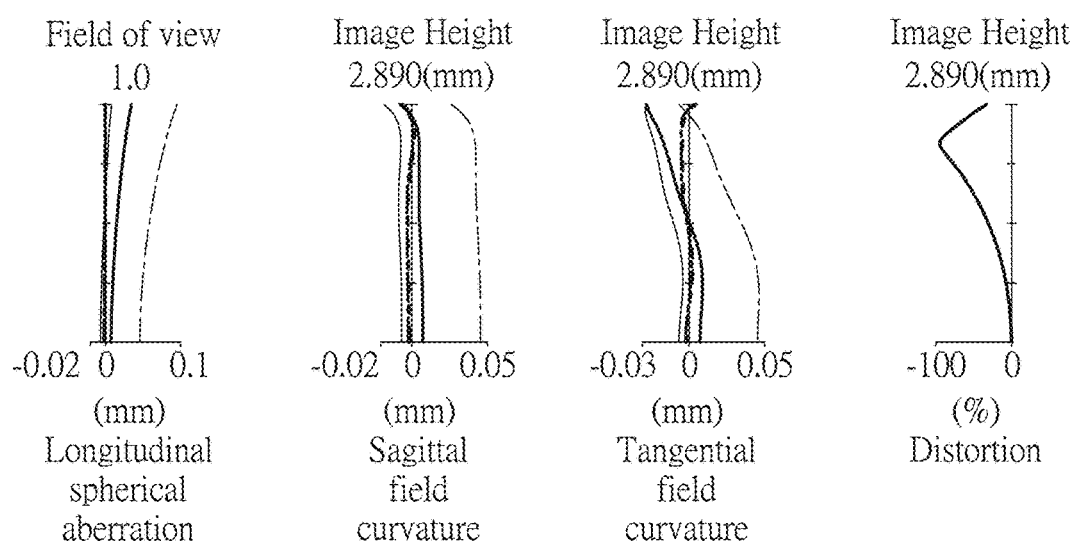
FIG. 11A illustrates the longitudinal spherical aberration on the image plane of the third embodiment.
FIG. 11B illustrates the field curvature on the sagittal direction of the third embodiment.
FIG. 11C illustrates the field curvature on the tangential direction of the third embodiment.
FIG. 11D illustrates the distortion of the third embodiment.

Please refer to FIG. 10 which illustrates the third embodiment of the optical imaging lens 1 of the present invention. Please refer to FIG. 11A for the longitudinal spherical aberration on the image plane 91 of the third embodiment; please refer to FIG. 11B for the field curvature aberration on the sagittal direction; please refer to FIG. 11C for the field curvature aberration on the tangential direction; and please refer to FIG. 11D for the distortion aberration. The components in this embodiment are similar to those in the first embodiment, but the optical data such as the refracting power, the radius, the lens thickness, the aspheric surface or the back focal length in this embodiment are different from the optical data in the first embodiment. Besides, in this embodiment, the third lens element 30 has negative refracting power.

The optical data of the third embodiment of the optical imaging lens are shown in FIG. 22 while the aspheric surface data are shown in FIG. 23. The optical design of the embodiment has good thermal stability. Normal temperature 20° C. is set to be a standard. A back focal shift at this temperature is 0.000 mm. The back focal shift is −0.008 mm when the temperature is raised to 80° C. and the back focal shift is 0.008 mm when the temperature is dropped to −40° C. In this embodiment, EFL=1.583 mm; HFOV=110.180 degrees; TTL=28.974 mm; Fno=2.000; ImgH=2.890 mm. In particular, 1) the field curvature aberration on the sagittal direction of the optical imaging lens in this embodiment is better than that of the optical imaging lens in the first embodiment, 2) the field curvature aberration on the tangential direction of the optical imaging lens in this embodiment is better than that of the optical imaging lens in the first embodiment, and 3) the distortion aberration of the optical imaging lens in this embodiment is better than that of the optical imaging lens in the first embodiment.

Fourth Embodiment

Figure 12:
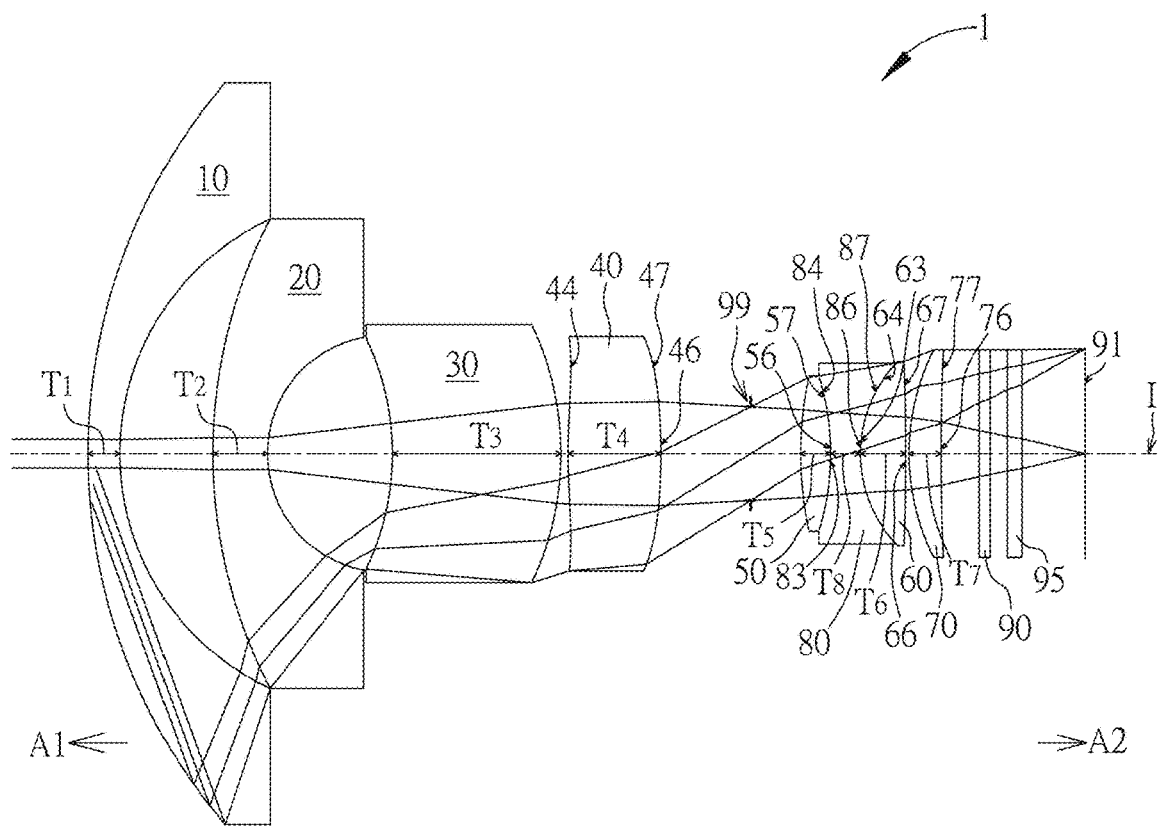
FIG. 12 illustrates a fourth embodiment of the optical imaging lens of the present invention.
Figures 13A, 13B, 13C, 13D:
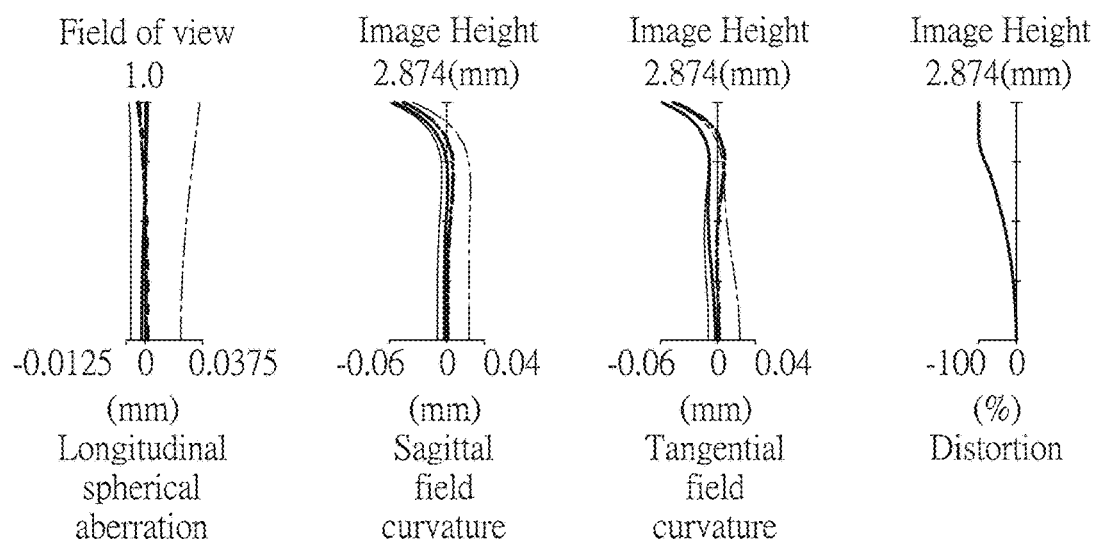
FIG. 13A illustrates the longitudinal spherical aberration on the image plane of the fourth embodiment.
FIG. 13B illustrates the field curvature on the sagittal direction of the fourth embodiment.
FIG. 13C illustrates the field curvature on the tangential direction of the fourth embodiment.
FIG. 13D illustrates the distortion of the fourth embodiment.

Please refer to FIG. 12 which illustrates the fourth embodiment of the optical imaging lens 1 of the present invention. Please refer to FIG. 13A for the longitudinal spherical aberration on the image plane 91 of the fourth embodiment; please refer to FIG. 13B for the field curvature aberration on the sagittal direction; please refer to FIG. 13C for the field curvature aberration on the tangential direction; and please refer to FIG. 13D for the distortion aberration. The components in this embodiment are similar to those in the first embodiment, but the optical data such as the refracting power, the radius, the lens thickness, the aspheric surface or the back focal length in this embodiment are different from the optical data in the first embodiment. Besides, in this embodiment, the periphery region 44 of the object-side surface 41 of the fourth lens element 40 is concave, the optical axis region 46 and the periphery region 47 of the image-side surface 42 of the fourth lens element 40 are convex, the fifth lens element 50 has positive refracting power, the optical axis region 56 and the periphery region 57 of the image-side surface 52 of the fifth lens element 50 are convex, the sixth lens element 60 has positive refracting power, the optical axis region 63 and the periphery region 64 of the object-side surface 61 of the sixth lens element 60 are convex, the optical axis region 66 and the periphery region 67 of the image-side surface 62 of the sixth lens element 60 are convex, the optical axis region 76 and the periphery region 77 of the image-side surface 72 of the seventh lens element 70 are concave, the eighth lens element 80 has negative refracting power, the optical axis region 83 and the periphery region 84 of the object-side surface 81 of the eighth lens element 80 are concave, and the optical axis region 86 and the periphery region 87 of the image-side surface 82 of the eighth lens element 80 are concave.

The optical data of the fourth embodiment of the optical imaging lens are shown in FIG. 24 while the aspheric surface data are shown in FIG. 25. The optical design of the embodiment has good thermal stability. Normal temperature 20° C. is set to be a standard. A back focal shift at this temperature is 0.000 mm. The back focal shift is −0.011 mm when the temperature is raised to 80° C. and the back focal shift is 0.011 mm when the temperature is dropped to −40° C. In this embodiment, EFL=1.718 mm; HFOV=110.000 degrees; TTL=27.499 mm; Fno=2.200; ImgH=2.874 mm. In particular, 1) the field curvature aberration on the sagittal direction of the optical imaging lens in this embodiment is better than that of the optical imaging lens in the first embodiment, 2) the field curvature aberration on the tangential direction of the optical imaging lens in this embodiment is better than that of the optical imaging lens in the first embodiment, and 3) the distortion aberration of the optical imaging lens in this embodiment is better than that of the optical imaging lens in the first embodiment.

Fifth Embodiment

Figure 14:
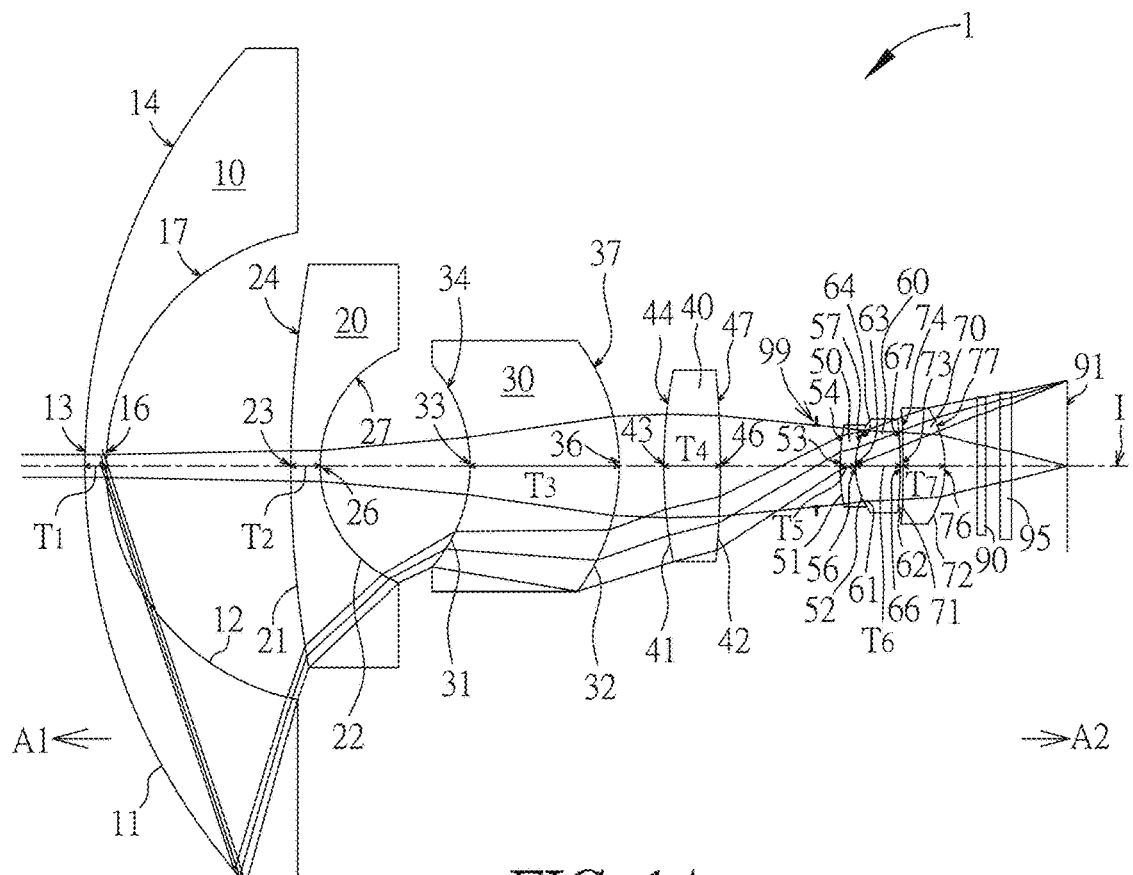
FIG. 14 illustrates a fifth embodiment of the optical imaging lens of the present invention.
Figures 15A, 15B, 15C, 15D:
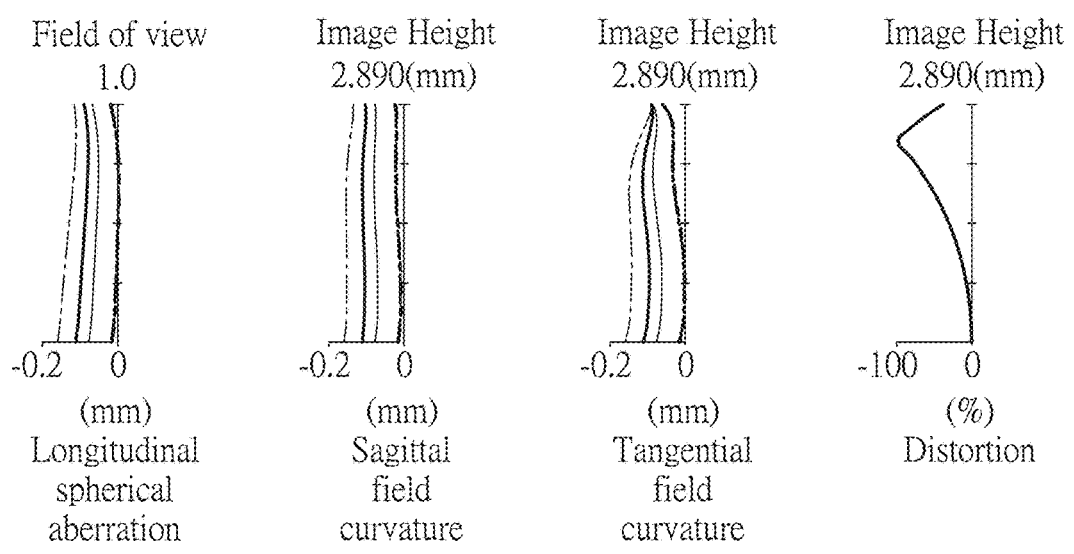
FIG. 15A illustrates the longitudinal spherical aberration on the image plane of the fifth embodiment.
FIG. 15B illustrates the field curvature on the sagittal direction of the fifth embodiment.
FIG. 15C illustrates the field curvature on the tangential direction of the fifth embodiment.
FIG. 15D illustrates the distortion of the fifth embodiment.

Please refer to FIG. 14 which illustrates the fifth embodiment of the optical imaging lens 1 of the present invention. Please refer to FIG. 15A for the longitudinal spherical aberration on the image plane 91 of the fifth embodiment; please refer to FIG. 15B for the field curvature aberration on the sagittal direction; please refer to FIG. 15C for the field curvature aberration on the tangential direction, and please refer to FIG. 15D for the distortion aberration. The components in this embodiment are similar to those in the first embodiment, but the design of the fifth embodiment consists of seven lens elements, and optical data such as the refracting power, the radius, the lens thickness, the aspheric surface or the back focal length in this embodiment are different from the optical data in the first embodiment.

The first lens element 10 is arranged to be a lens element in a first order from the object-side A1 to the image-side A2. The first lens element 10 has negative refracting power. An optical axis region 13 and a periphery region 14 of the object-side surface 11 of the first lens element 10 are convex. An optical axis region 16 and a periphery region 17 of the image-side surface 12 of the first lens element 10 are concave. Besides, the object-side surface 11 and the image-side surface 12 of the first lens element 10 may be spherical surfaces, but it is not limited thereto.

The second lens element 20 is arranged to be a lens element in a second order from the object-side A1 to the image-side A2. The second lens element 20 has negative refracting power. An optical axis region 23 and a periphery region 24 of the object-side surface 21 of the second lens element 20 are convex. An optical axis region 26 and a periphery region 27 of the image-side surface 22 of the second lens element 20 are concave. Besides, the object-side surface 21 and the image-side surface 22 of the second lens element 20 may be spherical surfaces, but it is not limited thereto.

The third lens element 30 is arranged to be a lens element in a third order from the object-side A1 to the image-side A2. The third lens element 30 has positive refracting power. An optical axis region 33 and a periphery region 34 of the object-side surface 31 of the third lens element 30 are concave. An optical axis region 36 and a periphery region 37 of the image-side surface 32 of the third lens element 30 are convex. Besides, the object-side surface 31 and the image-side surface 32 of the third lens element 30 may be aspherical surfaces, but it is not limited thereto.

The fourth lens element 40 is arranged to be a lens element in a fourth order from the object-side A1 to the image-side A2. The fourth lens element 40 has positive refracting power. An optical axis region 43 and a periphery region 44 of the object-side surface 41 of the fourth lens element 40 are convex. An optical axis region 46 and a periphery region 47 of the image-side surface 42 of the fourth lens element 40 are convex. Besides, the object-side surface 41 and the image-side surface 42 of the fourth lens element 40 may be spherical surfaces, but it is not limited thereto.

The fifth lens element 50 is arranged to be a lens element in a fifth order from the object-side A1 to the image-side A2. The fifth lens element 50 has negative refracting power. An optical axis region 53 and a periphery region 54 of the object-side surface 51 of the fifth lens element 50 are convex. An optical axis region 56 and a periphery region 57 of the image-side surface 52 of the fifth lens element 50 are concave. Besides, the object-side surface 51 and the image-side surface 52 of the fifth lens element 50 may be spherical surfaces, but it is not limited thereto.

The sixth lens element 60 is arranged to be a lens element in a second order from the image-side A2 to the object-side A1. The sixth lens element 60 has positive refracting power. An optical axis region 63 and a periphery region 64 of the object-side surface 61 of the sixth lens element 60 are convex. An optical axis region 66 and a periphery region 67 of the image-side surface 62 of the sixth lens element 60 are convex. Besides, the object-side surface 61 and the image-side surface 62 of the sixth lens element 60 may be spherical surfaces, but it is not limited thereto.

The seventh lens element 70 is arranged to be a lens element in a first order from the image-side A2 to the object-side A1. The seventh lens element 70 has positive refracting power. An optical axis region 73 of the object-side surface 71 of the seventh lens element 70 is convex and a periphery region 74 of the object-side surface 71 of the seventh lens element 70 is concave. An optical axis region 76 and a periphery region 77 of the image-side surface 72 of the seventh lens element 70 are convex. Besides, the object-side surface 71 and the image-side 72 of the seventh lens element 70 may be aspherical surfaces, but it is not limited thereto.

The optical data of the fifth embodiment of the optical imaging lens are shown in FIG. 26 while the aspheric surface data are shown in FIG. 27. The optical design of the embodiment has good thermal stability. Normal temperature 20° C. is set to be a standard. Aback focal shift at this temperature is 0.000 mm. The back focal shift is −0.011 mm when the temperature is raised to 80° C. and the back focal shift is 0.008 mm when the temperature is dropped to −40° C. In this embodiment, EFL=1.558 mm; HFOV=108.460 degrees; TTL=33.686 mm; Fno=2.000; ImgH=2.890 mm. In particular, 1) the field curvature aberration on the sagittal direction of the optical imaging lens in this embodiment is better than that of the optical imaging lens in the first embodiment, 2) the field curvature aberration on the tangential direction of the optical imaging lens in this embodiment is better than that of the optical imaging lens in the first embodiment, and 3) the distortion aberration of the optical imaging lens in this embodiment is better than that of the optical imaging lens in the first embodiment.

Sixth Embodiment

Figure 16:
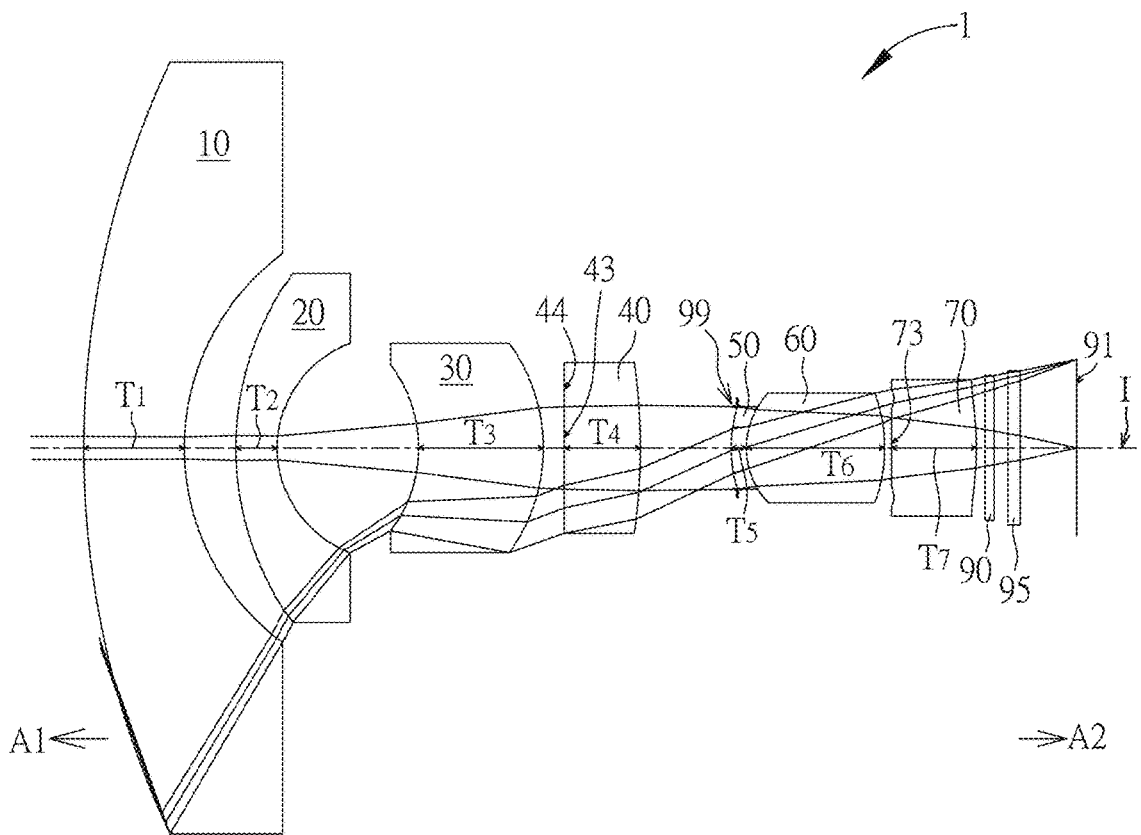
FIG. 16 illustrates a sixth embodiment of the optical imaging lens of the present invention.
Figures 17A, 17B, 17C, 17D:
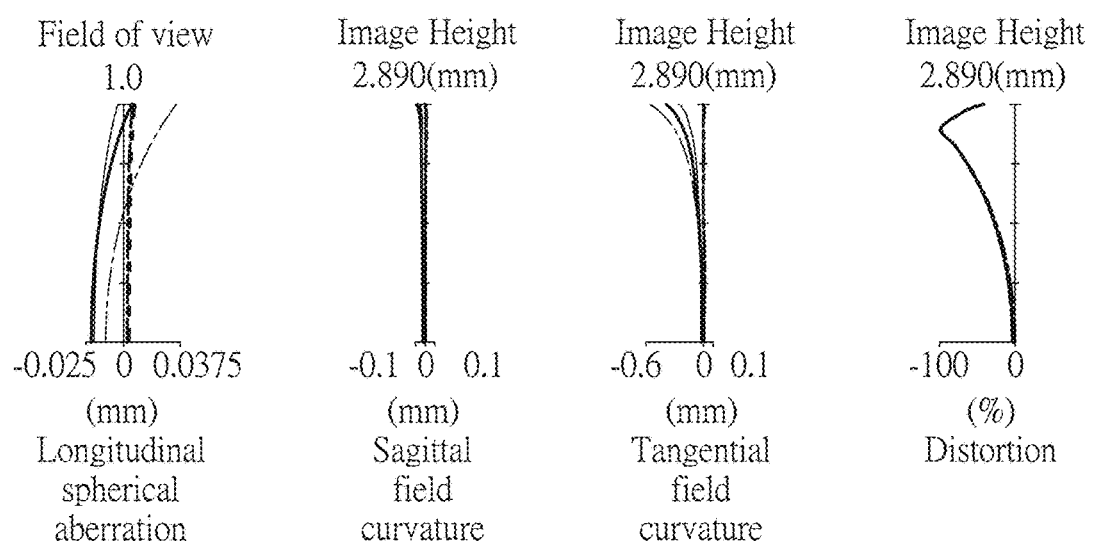
FIG. 17A illustrates the longitudinal spherical aberration on the image plane of the sixth embodiment.
FIG. 17B illustrates the field curvature on the sagittal direction of the sixth embodiment.
FIG. 17C illustrates the field curvature on the tangential direction of the sixth embodiment.
FIG. 17D illustrates the distortion of the sixth embodiment.

Please refer to FIG. 16 which illustrates the sixth embodiment of the optical imaging lens 1 of the present invention. The sixth embodiment consists of seven lens elements. Please refer to FIG. 17A for the longitudinal spherical aberration on the image plane 91 of the sixth embodiment; please refer to FIG. 17B for the field curvature aberration on the sagittal direction; please refer to FIG. 17C for the field curvature aberration on the tangential direction, and please refer to FIG. 17D for the distortion aberration. The components in this embodiment are similar to those in the fifth embodiment, but the optical data such as the refracting power, the radius, the lens thickness, the aspheric surface or the back focal length in this embodiment are different from the optical data in the first embodiment. Besides, in this embodiment, the optical axis region 43 of the object-side surface 41 of the fourth lens element 40 is flat, its periphery region 44 is flat, the optical axis region 73 of the object-side surface 71 of the seventh lens element 70 is concave.

The optical data of the sixth embodiment of the optical imaging lens are shown in FIG. 28 while the aspheric surface data are shown in FIG. 29. The first embodiment of the optical imaging lens 1 has good thermal stability. Normal temperature 20° C. is set to be a standard. A back focal shift at this temperature is 0.000 mm. The back focal shift is −0.005 mm when the temperature is raised to 80° C. and the back focal shift is 0.005 mm when the temperature is dropped to −40° C. In this embodiment, EFL=1.812 mm; HFOV=110.050 degrees; TTL=32.690 mm; Fno=2.400; ImgH=2.890 mm. In particular, the longitudinal spherical aberration of the optical imaging lens in this embodiment is better than that of the optical imaging lens in the fifth embodiment.

The lens elements in the above six embodiments employ a glass material to be measured at a wavelength from 470 nm to 950 nm between a temperature range from −40° C. to 80° C. meets a requirement of $|dn/dt| \leq 11.000 \times 10^{-6}/°$ C., but it is not limited thereto. dn/dt stands for the temperature parameter of refractive index, which refers to the change of refractive index per unit temperature, namely the value of the change of the refractive index when the temperature rises by 1° C.

Some important parameters and ratios in each embodiment are shown in FIG. 30 and in FIG. 31.

1. The lens configuration in each embodiment of the present invention provides an optical imaging lens with large field of view and of good imaging quality. By the combination of the surface curvatures and refracting power of the lens elements, for example: the first lens element has negative refracting power, the second lens element has negative refracting power, the optical axis region of the object-side surface of the third lens element is concave, an optical axis region of the object-side surface of the fourth lens element is convex, an optical axis region of the object-side surface of the fifth lens element is convex, to have the efficacy of correcting the longitudinal spherical aberration and the field curvature aberration, and decreasing the distortion aberration of the optical system. When the optical imaging lens satisfies: (G23+T3+T4+G45)/L5≤7.700, it may effectively decrease the system length of the optical imaging lens. It is preferably 2.700≤(G23+T3+T4+G45)/L57≥7.800. When the optical imaging lens further satisfies: $\upsilon 1 + \upsilon 2 \leq 80.000$, it may effectively improve the chromatic aberration, and the preferable range is $40.000 \leq \upsilon 1 + \upsilon 2 \leq 80.000$.

2. The lens configuration in each embodiment of the present invention provides an optical imaging lens with large field of view and of good imaging quality. By the combination of the surface curvatures and refracting power of the lens elements, for example: the first lens element has negative refracting power, the second lens element has negative refracting power, the optical axis region of the object-side surface of the third lens element is concave to go with the optical axis region of the object-side surface of the fifth lens element is convex or to go with the periphery region of the object-side surface of the fifth lens element being convex, to have the efficacy of correcting the longitudinal spherical aberration and the field curvature aberration, and decreasing the distortion aberration of the optical system. When the optical imaging lens satisfies: (T3+T7)/(G34+T5)≥3.200, it may effectively decrease the system length of the optical. The preferable range is 3.200≤(T3+T7)/(G34+T5)≤6.000. When the optical imaging lens further satisfies: $\upsilon 1 + \upsilon 2 \leq 80.000$, it may effectively improve the chromatic aberration, and the preferable range is $40.000 \leq \upsilon 1 + \upsilon 2 \leq 80.000$.

3. At least one lens element in the embodiments of the present invention employs a material of glass, and further selects a glass material to be measured at a wavelength from 470 nm to 950 nm between a temperature range from −40° C. to 80° C. to meet a requirement of $|dn/dt| \leq 11.000 \times 10^{-6}/°$ C. to have good efficacy of thermal stability. dn/dt stands for the temperature parameter of refractive index, which refers to a change of a refractive index per unit temperature, namely the value of the change of the refractive index when the temperature rises by 1° C.

4. When each embodiment of the present invention satisfies: HFOV/(TL+EFL)≥3.000°/mm, it may effectively enlarge the field of view and to decrease the system length of the optical imaging lens. The preferable range is 3.000°/mm≤HFOV/(TL+EFL)≤4.500°/mm.

5. When the optical imaging lens only has lens elements of seven elements or eight elements, it may have optimal efficacy of modification of imaging quality.

6. If the optical axis region of the object-side surface of the fourth lens element is designed to be flat or the periphery region is designed to be flat, it helps to decrease the thickness difference between the rim and the center to increase the fabrication yield.

7. In order to reduce the system length of the optical imaging lens along the optical axis I and to ensure the imaging quality, the thickness of each lens element or the air gaps should be appropriately adjusted and the assembly or the manufacturing difficulty should be taken into consideration as well. If the following numerical conditions are satisfied, they facilitate better arrangements of the embodiments of the present invention:

$(G12+G23)/EFL \geq 3.400$, and the preferable range is $3.400 \leq (G12+G23)/EFL \leq 7.400$;  1)

$ALT/(T3+G45) \leq 2.700$, and the preferable range is $1.300 \leq ALT/(T3+G45) \leq 2.700$;  2)

$AAG/(G12+T3) \leq 2.200$, and the preferable range is $1.200 \leq AAG/(G12+T3) \leq 2.200$;  3)

$(T1+T5)/T2 \leq 2.800$, and the preferable range is $1.000 \leq (T1+T5)/T2 \leq 2.800$;  4)

$(T7+BFL)/T4 \leq 3.600$, and the preferable range is $1.500 \leq (T7+BFL)/T4 \leq 3.600$;  5)

$G45/T2 \geq 1.900$, and the preferable range is $1.900 \leq G45/T2 \leq 5.300$;  6)

$T3/(T2+G34) \geq 2.000$, and the preferable range is $2.000 \leq T3/(T2+G34) \leq 4.300$;  7)

$TTL/(G12+G23+G45) \leq 3.500$, and the preferable range is $2.000 \leq TTL/(G12+G23+G45) \leq 3.500$;  8)

$(G23+T4)/T2 \geq 4.000$, and the preferable range is $4.000 \leq (G23+T4)/T2 \leq 9.600$;  9)

$ALT/(T3+G67) \leq 4.800$, and the preferable range is $2.200 \leq ALT/(T3+G67) \leq 4.800$;  10)

$BFL/EFL \geq 1.400$, and the preferable range is $1.400 \leq BFL/EFL \leq 2.800$;  11)

$TL/(T2+T3+T4) \leq 4.500$, and the preferable range is $2.500 \leq TL/(T2+T3+T4) \leq 4.500$;  12)

$(T1+G56)/T6 \leq 5.500$, and the preferable range is $0.400 \leq (T1+G56)/T6 \leq 5.500$;  13)

$(T4+G45)/EFL \geq 2.100$, and the preferable range is $2.100 \leq (T4+G45)/EFL \leq 4.000$;  14)

$(G23+BFL)/(G34+T4) \geq 2.500$, and the preferable range is $2.500 \leq (G23+BFL)/(G34+T4) \leq 4.800$.  15)

Any arbitrary combination of the parameters of the embodiments can be selected to increase the lens limitation so as to facilitate the design of the same structure of the present invention.

In the light of the unpredictability of the optical imaging lens, the present invention suggests the above principles to preferably have a shorter system length of the optical imaging lens, a smaller F-number available, improved thermal stability, improved imaging quality or a better fabrication yield to overcome the drawbacks of prior art.

One or more above-mentioned limiting conditional formulae may be arbitrarily combined in the examples of the present invention, but the present invention is not limited to this. In the implementation of the present invention, detailed structures such as a convex or a concave surface arrangement of one or more lens elements may be additionally designed to enhance the control of system performance and/or resolution in addition to the aforementioned conditional formulae. It should be noted that these details may be selectively combined and applied to other examples of the present invention without conflict.

The numeral value ranges within the maximum and minimum values obtained from the combination ratio relationships of the optical parameters disclosed in each embodiment of the invention can all be implemented accordingly.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An optical imaging lens, from an object-side to an image-side in order along an optical axis comprising: a first lens element, a second lens element, a third lens element, a fourth lens element, a fifth lens element, a sixth lens element and a seventh lens element, the first lens element to the seventh lens element each having an object-side surface facing toward the object-side and allowing imaging rays to pass through as well as an image-side surface facing toward the image-side and allowing the imaging rays to pass through, wherein:

the first lens element is arranged to be a lens element in a first order from the object-side to the image-side and has negative refracting power;

the second lens element is arranged to be a lens element in a second order from the object-side to the image-side and has negative refracting power;

the third lens element is arranged to be a lens element in a third order from the object-side to the image-side and an optical axis region of the object-side surface of the third lens element is concave;

the fourth lens element is arranged to be a lens element in a fourth order from the object-side to the image-side and an optical axis region of the object-side surface of the fourth lens element is convex;

the fifth lens element is arranged to be a lens element in a fifth order from the object-side to the image-side and an optical axis region of the object-side surface of the fifth lens element is convex;

the sixth lens element is arranged to be a lens element in a second order from the image-side to the object-side; and the seventh lens element is arranged to be a lens element in a first order from the image-side to the object-side;

wherein, EFL is an effective focal length of the optical imaging lens, $v1$ is an Abbe number of the first lens element, $v2$ is an Abbe number of the second lens element, T3 is a thickness of the third lens element along the optical axis, T4 is a thickness of the fourth lens element along the optical axis, T5 is a thickness of the fifth lens element along the optical axis, T7 is a thickness of the seventh lens element along the optical axis, G23 is a distance from the image-side of the second lens element to the object-side of the third lens element along the optical axis, G34 is a distance from the image-side of the third lens element to the object-side of the fourth lens element along the optical axis, G45 is a distance from the image-side of the fourth lens element to the object-side of the fifth lens element along the optical axis, and L57 is a distance from the object-side of the fifth lens element to the object-side of the seventh lens element along the optical axis, and the optical imaging lens satisfies the relationship: $(T3+T7)/(G34+T5) \geq 3.200$, $(T4+G45)/EFL \geq 2.100$, $(G23+T3+T4+G45)/L57 \geq 2.700$ and $v1+v2 \leq 80.000$.

2. The optical imaging lens of claim 1, wherein ALT is a sum of thicknesses of the first lens element, the second lens element, the third lens element, the fourth lens element, the fifth lens element, the sixth lens element and the seventh lens element along the optical axis, and the optical imaging lens satisfies the relationship: $ALT/(T3+G45) \leq 2.700$.

3. The optical imaging lens of claim 1, wherein BFL is a distance from the image-side surface of the seventh lens element to an image plane along the optical axis and T7 is a thickness of the seventh lens element along the optical axis, and the optical imaging lens satisfies the relationship: $(T7+BFL)/T4 \leq 3.600$.

4. The optical imaging lens of claim 1, wherein T2 is a thickness of the second lens element along the optical axis, and the optical imaging lens satisfies the relationship: $(G23+T4)/T2 \geq 4.000$.

5. The optical imaging lens of claim 1, wherein TL is a distance from the object-side surface of the first lens element to the image-side surface of the seventh lens element along the optical axis and T2 is a thickness of the second lens element along the optical axis, and the optical imaging lens satisfies the relationship: $TL/(T2+T3+T4) \leq 4.500$.

6. The optical imaging lens of claim 1, wherein TTL is a distance from the object-side surface of the first lens element to an image plane along the optical axis and G12 is a distance from the image-side of the first lens element to the object-side of the second lens element along the optical axis, and the optical imaging lens satisfies the relationship: $TTL/(G12+G23+G45) \leq 3.500$.

7. An optical imaging lens, from an object-side to an image-side in order along an optical axis comprising: a first lens element, a second lens element, a third lens element, a fourth lens element, a fifth lens element, a sixth lens element and a seventh lens element, the first lens element to the seventh lens element each having an object-side surface facing toward the object-side and allowing imaging rays to pass through as well as an image-side surface facing toward the image-side and allowing the imaging rays to pass through, wherein:

the first lens element is arranged to be a lens element in a first order from the object-side to the image-side and has negative refracting power;

the second lens element is arranged to be a lens element in a second order from the object-side to the image-side and has negative refracting power;

the third lens element is arranged to be a lens element in a third order from the object-side to the image-side and an optical axis region of the object-side surface of the third lens element is concave;

the fourth lens element is arranged to be a lens element in a fourth order from the object-side to the image-side;

the fifth lens element is arranged to be a lens element in a fifth order from the object-side to the image-side and an optical axis region of the object-side surface of the fifth lens element is convex;

the sixth lens element is arranged to be a lens element in a second order from the image-side to the object-side; and the seventh lens element is arranged to be a lens element in a first order from the image-side to the object-side;

wherein, υ1 is an Abbe number of the first lens element; υ2 is an Abbe number of the second lens element, T3 is a thickness of the third lens element along the optical axis, T5 is a thickness of the fifth lens element along the optical axis, T7 is a thickness of the seventh lens element along the optical axis, G34 is a distance from the image-side of the third lens element to the object-side of the fourth lens element along the optical axis, and the optical imaging lens satisfies the relationship: (T3+T7)/(G34+T5)≥3.200 and υ1+υ2≤80.000.

8. The optical imaging lens of claim 7, wherein BFL is a distance from the image-side surface of the seventh lens element to an image plane along the optical axis, T4 is a thickness of the fourth lens element along the optical axis and G23 is a distance from the image-side of the second lens element to the object-side of the third lens element along the optical axis, and the optical imaging lens satisfies the relationship: (G23+BFL)/(G34+T4)≥2.500.

9. The optical imaging lens of claim 7, wherein HFOV stands for the half field of view of the optical imaging lens, TL is a distance from the object-side surface of the first lens element to the image-side surface of the seventh lens element along the optical axis and EFL is an effective focal length of the optical imaging lens, and the optical imaging lens satisfies the relationship: HFOV/(TL+EFL)≥3.000°/mm.

10. The optical imaging lens of claim 7, wherein AAG is a sum of a distance from the image-side of the first lens element to the object-side of the second lens element, a distance from the image-side of the second lens element to the object-side of the third lens element, a distance from the image-side of the third lens element to the object-side of the fourth lens element, a distance from the image-side of the fourth lens element to the object-side of the fifth lens element, a distance from the image-side of the fifth lens element to the object-side of the sixth lens element and a distance from the image-side of the sixth lens element to the object-side of the seventh lens element along the optical axis and G12 is a distance from the image-side of the first lens element to the object-side of the second lens element along the optical axis, and the optical imaging lens satisfies the relationship: AAG/(G12+T3)≤2.200.

11. The optical imaging lens of claim 7, wherein T1 is a thickness of the first lens element along the optical axis and T2 is a thickness of the second lens element along the optical axis, and the optical imaging lens satisfies the relationship: (T1+T5)/T2≤2.800.

12. The optical imaging lens of claim 7, wherein ALT is a sum of thicknesses of the first lens element, the second lens element, the third lens element, the fourth lens element, the fifth lens element, the sixth lens element and the seventh lens element along the optical axis and G67 is a distance from the image-side of the sixth lens element to the object-side of the seventh lens element along the optical axis, and the optical imaging lens satisfies the relationship: ALT/(T3+G67)≤4.800.

13. The optical imaging lens of claim 7, wherein BFL is a distance from the image-side surface of the seventh lens element to an image plane along the optical axis and EFL is an effective focal length of the optical imaging lens, and the optical imaging lens satisfies the relationship: BFL/EFL≥1.400.

14. An optical imaging lens, from an object-side to an image-side in order along an optical axis comprising: a first lens element, a second lens element, a third lens element, a fourth lens element, a fifth lens element, a sixth lens element and a seventh lens element, the first lens element to the seventh lens element each having an object-side surface facing toward the object-side and allowing imaging rays to pass through as well as an image-side surface facing toward the image-side and allowing the imaging rays to pass through, wherein:

the first lens element is arranged to be a lens element in a first order from the object-side to the image-side and has negative refracting power;

the second lens element is arranged to be a lens element in a second order from the object-side to the image-side and has negative refracting power;

the third lens element is arranged to be a lens element in a third order from the object-side to the image-side and an optical axis region of the object-side surface of the third lens element is concave;

the fourth lens element is arranged to be a lens element in a fourth order from the object-side to the image-side;

the fifth lens element is arranged to be a lens element in a fifth order from the object-side to the image-side and a periphery region and an optical axis region of the object-side surface of the fifth lens element are convex;

the sixth lens element is arranged to be a lens element in a second order from the image-side to the object-side; and the seventh lens element is arranged to be a lens element in a first order from the image-side to the object-side;

wherein, v1 is an Abbe number of the first lens element, v2 is an Abbe number of the second lens element, T3 is a thickness of the third lens element along the optical axis, T5 is a thickness of the fifth lens element along the optical axis, T7 is a thickness of the seventh lens element along the optical axis, G34 a distance from the image-side of the third lens element to the object-side of the fourth lens element along the optical axis, and the optical imaging lens satisfies the relationship: (T3+T7)/(G34+T5)≥3.200 and v1~v2≤80.000.

15. The optical imaging lens of claim 14, wherein T1 is a thickness of the first lens element along the optical axis, T6 is a thickness of the sixth lens element along the optical axis and G56 is a distance from the image-side of the fifth lens element to the object-side of the sixth lens element along the optical axis, and the optical imaging lens satisfies the relationship: (T1+G56)/T6≤5.500.

16. The optical imaging lens of claim 14, wherein dn/dt is a value of a change of a refractive index of the lens element when the temperature rises by 1° C., and a material of the first lens element, the second lens element, the third lens element, the fourth lens element, the fifth lens element, the sixth lens element and the seventh lens element to be measured at a wavelength from 470 nm to 950 nm between a temperature range from −40° C. to 80° C. meets a requirement of |dn/dt|≤11.000×10−6/° C.

17. The optical imaging lens of claim 14, wherein T2 is a thickness of the second lens element along the optical axis and G45 is a distance from the image-side of the fourth lens element to the object-side of the fifth lens element along the optical axis, and the optical imaging lens satisfies the relationship: G45/T2≥1.900.

18. The optical imaging lens of claim 14, wherein T2 is a thickness of the second lens element along the optical axis, and the optical imaging lens satisfies the relationship: T3/(T2+G34)≥2.000.

19. The optical imaging lens of claim 14, wherein EFL is an effective focal length of the optical imaging lens, G12 is a distance from the image-side of the first lens element to the object-side of the second lens element along the optical axis and G23 is a distance from the image-side of the second lens element to the object-side of the third lens element along the optical axis, and the optical imaging lens satisfies the relationship: (G12+G23)/EFL≥3.400.

* * * * *